United States Patent
Ghan et al.

(10) Patent No.: US 9,562,757 B2
(45) Date of Patent: Feb. 7, 2017

(54) REMOVAL OF AN ACCUMULATED FROZEN SUBSTANCE FROM A COOLING UNIT

(75) Inventors: Michael A. Ghan, Kirkland, WA (US); James R. Conant, Kirkland, WA (US)

(73) Assignee: The Controls Group, Inc., Kirkland, WA (US)

( * ) Notice: Subject to any disclaimer, the term of this patent is extended or adjusted under 35 U.S.C. 154(b) by 1872 days.

(21) Appl. No.: 12/897,487

(22) Filed: Oct. 4, 2010

(65) Prior Publication Data
US 2011/0079027 A1    Apr. 7, 2011

Related U.S. Application Data

(60) Provisional application No. 61/248,372, filed on Oct. 2, 2009.

(51) Int. Cl.
*F25D 21/00* (2006.01)
*G01B 7/06* (2006.01)
*F25D 21/02* (2006.01)

(52) U.S. Cl.
CPC ............... *G01B 7/06* (2013.01); *F25D 21/006* (2013.01); *F25D 21/02* (2013.01)

(58) Field of Classification Search
CPC ........ F25D 21/006; F25D 21/02; F25D 29/00; F25D 31/003; F25D 21/025; F25D 21/022; F25D 21/04; F25D 21/14; F25B 49/005; F25B 2700/111; F25B 2500/222; F25B 47/022; F25B 39/02; F25B 39/022; G01D 5/2415; G01D 5/2417; G01N 2700/221; G01B 7/14; G01B 7/087; G01B 11/0616; G01B 19/02; G01B 7/06; G01R 35/005; B64D 15/20; G01K 15/00; G01K 13/002; G01K 1/14; G01K 13/02; G01K 7/08
(Continued)

(56) References Cited

U.S. PATENT DOCUMENTS 2,114,740 A * 4/1938 Henning ............ H01H 35/2607
200/83 P
2,828,391 A * 3/1958 Slonneger .............. H01H 37/00
200/83 P
(Continued)

FOREIGN PATENT DOCUMENTS

CA    2346206 A1 * 11/2001
EP    0092089          10/1983
(Continued)

OTHER PUBLICATIONS

J. B. Calvert, "Ice: Structure and Properties" http://mysite.du.edu/~jcalvert/phys/ice.htm#Stru, Apr. 6, 2003, pp. 7.
(Continued)

*Primary Examiner* — M. Alexandra Elve
*Assistant Examiner* — Alexis Cox
(74) *Attorney, Agent, or Firm* — Fogg & Powers LLC

(57) ABSTRACT

A probe includes a sensor and a support. The sensor is operable to provide an indication of a thickness of a frozen substance that has accumulated between the sensor and a cooling fin of a cooling unit, and the support is operable to hold the sensor spaced apart from the cooling fin. When a defrost controller uses such a probe to monitor an amount of frost build up on the fin or fins of a cooling unit (e.g., a refrigeration unit or freezer unit), the defrost controller can initiate a defrost cycle only when warranted, e.g., only when the thickness of the built-up frost equals or exceeds a threshold thickness.

37 Claims, 10 Drawing Sheets

(58) Field of Classification Search
USPC ......... 62/126–129, 139, 140, 151, 275, 277, 62/515; 324/600–663, 671; 702/106, 170; 340/580; 374/1, 7, 100, 141, 143, 184
See application file for complete search history.

(56) References Cited

U.S. PATENT DOCUMENTS

| | | | | |
|---|---|---|---|---|
| 2,904,968 | A * | 9/1959 | Spencer, Jr. | F25D 21/002 62/140 |
| 3,410,969 | A * | 11/1968 | Good | G04C 23/36 200/38 R |
| 3,965,692 | A * | 6/1976 | Ansted | F25B 49/02 62/193 |
| 4,123,792 | A * | 10/1978 | Gephart et al. | 361/30 |
| 4,203,014 | A * | 5/1980 | Harris | H01H 43/104 200/38 A |
| 4,989,413 | A * | 2/1991 | Fukuda | 62/155 |
| 5,095,710 | A * | 3/1992 | Black | A23G 9/045 62/136 |
| 5,103,649 | A * | 4/1992 | Kieffer | A23G 9/045 366/145 |
| 5,179,841 | A * | 1/1993 | Phillips | F25D 21/006 62/155 |
| 5,212,954 | A * | 5/1993 | Black | A23G 9/045 165/64 |
| 5,228,300 | A * | 7/1993 | Shim | F25D 21/006 62/131 |
| 6,239,601 | B1 * | 5/2001 | Weinstein | 324/662 |
| 6,467,282 | B1 * | 10/2002 | French et al. | 62/140 |
| 6,715,304 | B1 * | 4/2004 | Wycoff | F25D 21/002 62/155 |
| 6,883,343 | B2 * | 4/2005 | Lane | A47F 3/0417 62/246 |
| 7,461,515 | B2 * | 12/2008 | Wellman | F25B 47/022 137/315.33 |
| 7,466,146 | B2 | 12/2008 | Stewart et al. | |
| 7,992,396 | B2 * | 8/2011 | Thybo | F25B 5/02 62/155 |
| 8,479,527 | B2 * | 7/2013 | Song et al. | 62/81 |
| 8,806,879 | B2 * | 8/2014 | Thybo | F25B 5/02 62/155 |
| 2007/0056947 | A1 * | 3/2007 | Damian | B60H 1/00785 219/203 |
| 2007/0119193 | A1 * | 5/2007 | Davis et al. | 62/135 |
| 2007/0209380 | A1 * | 9/2007 | Mueller | F25B 47/025 62/260 |
| 2012/0055181 | A1 * | 3/2012 | Kim | F25D 21/02 62/80 |
| 2014/0352335 | A1 * | 12/2014 | Anderson | F25D 21/008 62/80 |

FOREIGN PATENT DOCUMENTS

| | | | |
|---|---|---|---|
| EP | 0278701 | | 8/1988 |
| EP | 0563751 | | 10/1993 |
| EP | 0608327 | | 7/1997 |
| GB | EP 0563751 | * | 8/1998 |
| WO | 2011041780 | | 4/2011 |

OTHER PUBLICATIONS

Hansen, Frost Master & Frost Master Plus Defrost Controllers, Bulletin F100c, Sep. 2006, pp. 12.
International Search Report for International Application No. PCT/US2010/051317, Korean Intellectual Property Office, May 26, 2011, pp. 3.

* cited by examiner

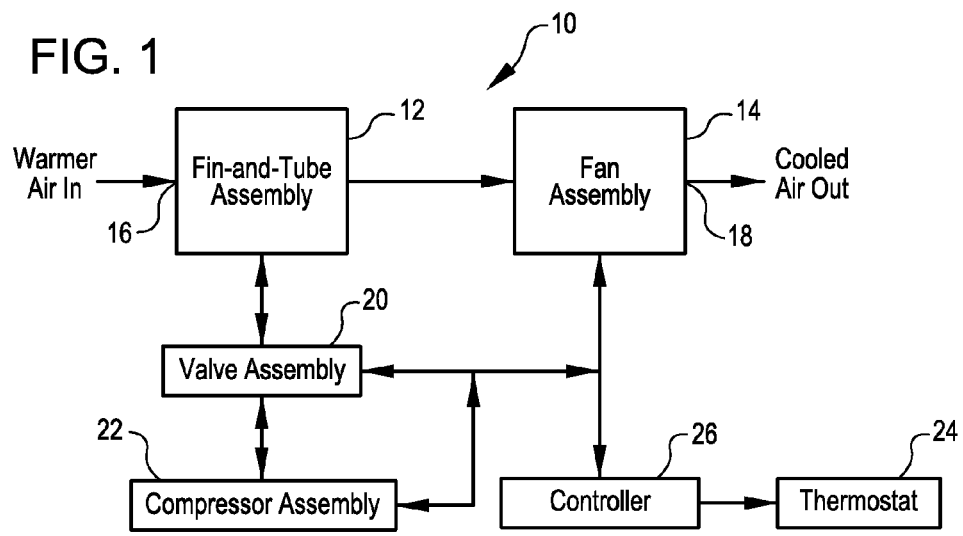
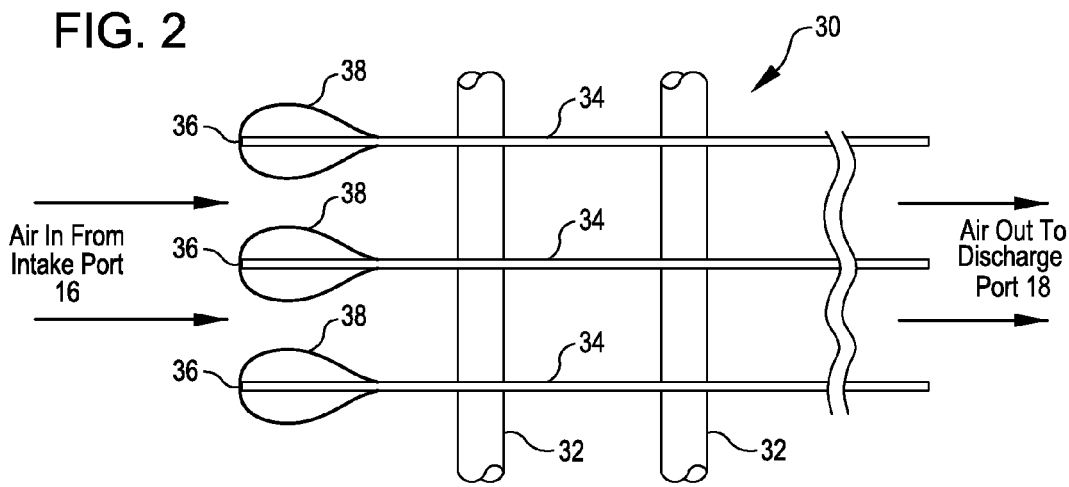
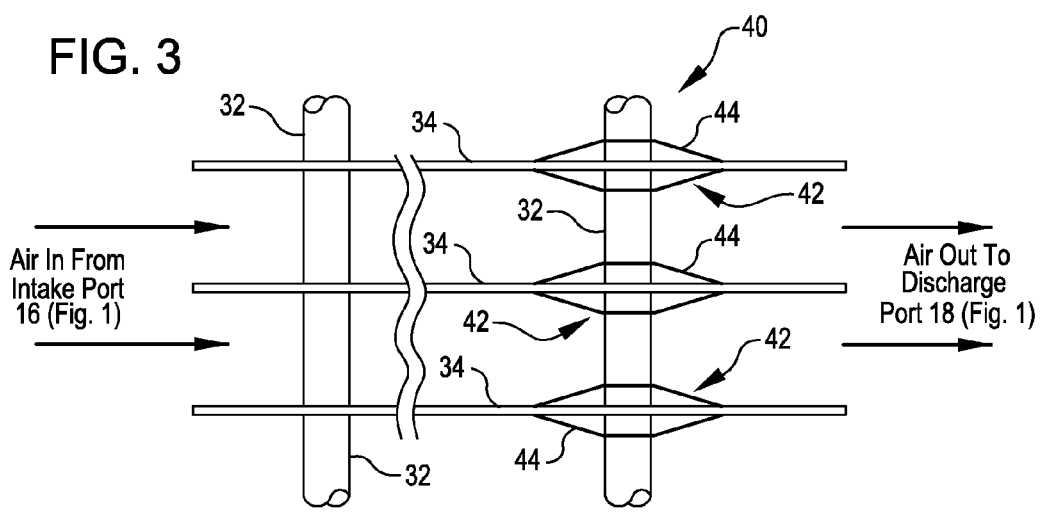

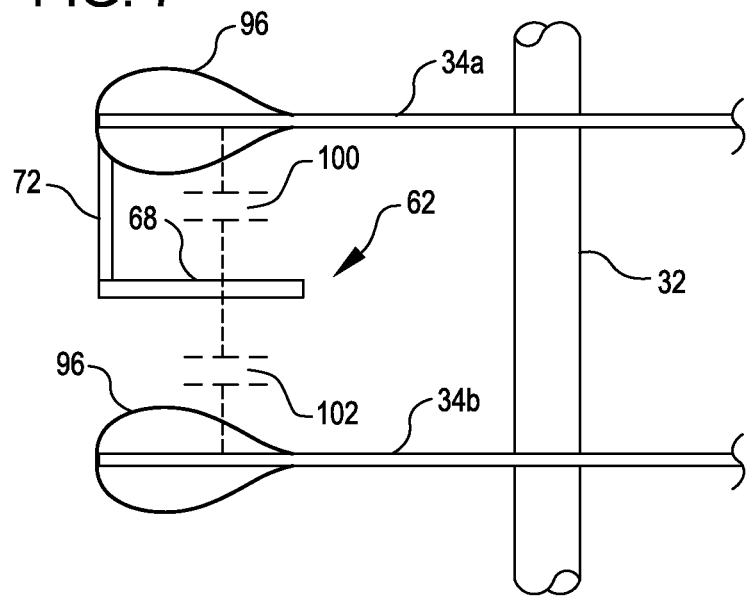
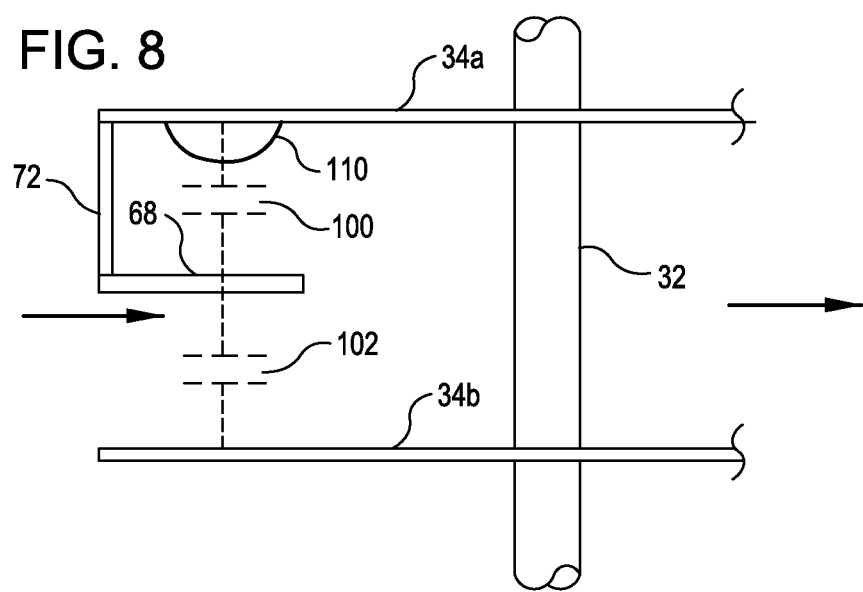

REMOVAL OF AN ACCUMULATED FROZEN SUBSTANCE FROM A COOLING UNIT

CLAIM OF PRIORITY

This application claims priority to U.S. Provisional Application Ser. No. 61/248,372 filed on Oct. 2, 2009, which is incorporated by reference.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

An embodiment of a probe includes a sensor and a support. The sensor is operable to provide an indication of a thickness of a frozen substance that has accumulated between the sensor and a cooling fin of a cooling unit, and the support is operable to hold the sensor spaced apart from the cooling fin.

For example, a defrost controller may use an embodiment of such a probe to monitor an amount of frost build up on the fin or fins of a cooling unit (e.g., a refrigeration or freezer unit) so that the controller may initiate a defrost cycle only when needed. Such a probe may be more reliable than other defrost-detection techniques, and such a defrost controller may increase the cooling and energy efficiencies of a cooling unit as compared to a cooling unit having a conventional defrost controller.

BRIEF DESCRIPTION OF THE DRAWINGS

FIG. 1 is a schematic diagram of an embodiment of a cooling unit.

FIG. 2 is a plan view of a pattern of an accumulation of a frozen substance on the fins of a cooling unit.

FIG. 3 is a plan view of another pattern of an accumulation of a frozen substance on the fins of a cooling unit.

FIG. 7 is a plan view of an embodiment of a frozen-substance probe attached to a fin of a cooling unit, where on the fin is an accumulation of a frozen substance.

FIG. 8 is a plan view of an embodiment of a frozen-substance probe attached to a fin of a cooling unit, where on the fin is an artifact that may affect the measurement of an accumulation of a frozen substance.

DETAILED DESCRIPTION

Figure 4:
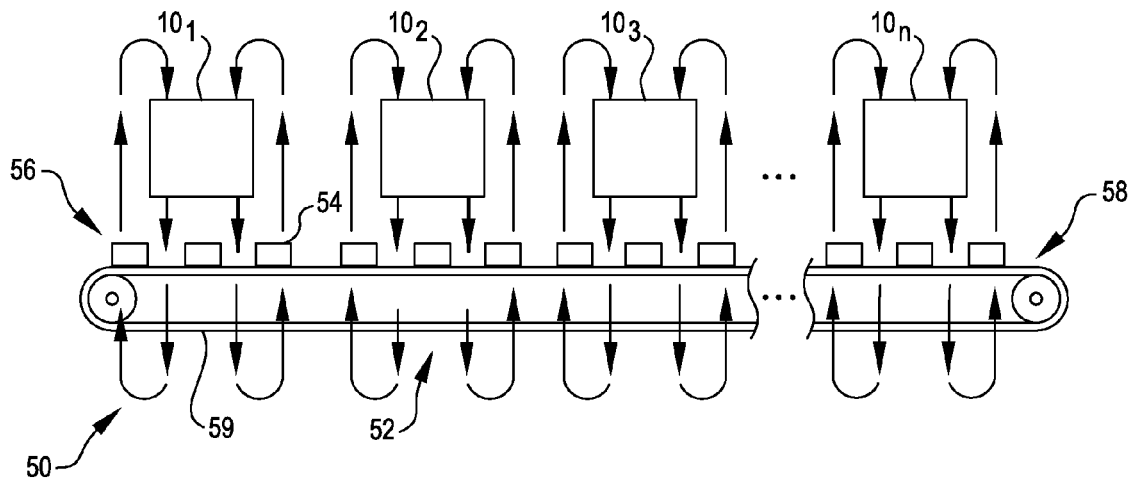
FIG. 4 is diagram of an embodiment of a cooling system having multiple cooling units.

FIG. 1 is a block diagram of a cooling unit 10, which may be, for example, a refrigeration or freezer unit for a warehouse in which perishable items are stored.

The cooling unit 10 includes an internal fin-and-tube assembly (sometimes called an evaporator-coil assembly) 12, a fan assembly 14, input and discharge ports 16 and 18, a valve assembly 20, a compressor assembly 22, a thermostat 24, and a controller 26.

The fin-and-tube assembly 12 includes at least one serpentine tube (not shown in FIG. 1) that weaves back and forth through a number of cooling fins (also not shown in FIG. 1). During a cooling cycle, the tube carries expanding refrigerant gas (hereinafter "refrigerant") that removes heat energy from, i.e., cools, the air that passes through the fin-and-tube assembly 12. And during a defrost cycle, which is discussed in more detail below, the tube carries compressed refrigerant that is warm enough to melt the frost that may have accumulated on the tube or on the fins.

The fan assembly 14 causes warmer air to flow from the space being cooled (not shown in FIG. 1), through the input port 16, and through the fin-and-tube assembly 12 for cooling, and then causes the cooled air to flow through the discharge port 18 back into the space being cooled.

The valve assembly 20 controls the routing of the refrigerant to the fin-and-tube assembly 12 during cooling and defrost cycles.

The compressor assembly 22 compresses the refrigerant, and may include other components of the heat-pump path such as an accumulator/condenser (not shown in FIG. 1) for accumulating liquid refrigerant formed when the refrigerant transitions from a gas state to a liquid state as the refrigerant absorbs heat, and such as an external fin-and-tube assembly (also not shown in FIG. 1) for releasing into the atmosphere the heat absorbed by the internal fin-and-tub assembly 12 from the space being cooled.

The thermostat 24 monitors the temperature within the space being cooled, and sends to the controller 26 a signal indicative of this temperature. The thermostat 24 may be located within the space being cooled, or it may be located remote from the space being cooled but and coupled to a temperature sensor (not shown in FIG. 1) that is located within the space.

The controller 26 controls the operations of the fin-and-tube assembly 12, the fan assembly 14, the valve assembly 20, and the compressor assembly 22 in response to the thermostat 24. The controller 26 may also control the operations of one or more other components of the cooling system 10 in response to one or more components other than, or in addition to, the thermostat 24, where these other components are omitted from FIG. 1 for brevity. Furthermore, the controller 26 may be programmable, and may include a processor, computer, or other electronic circuitry.

Still referring to FIG. 1, the operation of an embodiment of the cooling unit 10 is discussed during a cooling cycle and a defrost cycle. For example purposes, the space being cooled is assumed to be a warehouse for which a refrigeration temperature of approximately 34°-36° Fahrenheit (F.) is desired.

During a period while the thermostat 24 indicates that the warehouse temperature is less than approximately 36° F., the controller 26 maintains the fan assembly 14 and the compressor assembly 12 inactive.

Next, when the thermostat 24 indicates that the warehouse temperature has risen to or above approximately 36° F. (for example, due to personnel opening doors that allow warmer, outside air to enter into the warehouse), the controller 26 initiates a cooling cycle by activating the compressor assembly 22 and the fan assembly 14, and by causing the valve assembly 20 to allow expanding refrigerant to enter the tubing of the fin-and-tube assembly 12. The controller 26 may activate the fan assembly 14 a delay time after activating the compressor assembly 22 to allow the fin-and-tube assembly 12 the chance to "get cold" before the fan assembly begins to draw the warmer air from the warehouse through the fin-and-tube assembly.

Then, when the thermostat 24 indicates that the warehouse temperature has fallen to or below approximately 34° F., the controller 26 halts the cooling cycle by deactivating the compressor assembly 22 and the fan assembly 14. The controller 26 may deactivate the fan assembly 14 a delay time after deactivating the compressor assembly 22 to allow the residual refrigerant in the tubing of the fin-and-tub assembly 12 to continue cooling the air until the refrigerant's cooling capacity is approximately exhausted.

Because the air that flows through the fin-and-tube assembly 12 may contain moisture (for example, from personnel opening exterior warehouse doors on a relatively humid day), and because at least portions of the fin-and-tube assembly may be at temperatures below 32°, which is the freezing point of water, ice or frost may form inside of the fin-and-tube assembly—possible patterns of such frost formation are discussed in more detail below in conjunction with FIGS. 2-3. For example, for refrigeration and freezer applications, the temperature of the refrigerant within the tubing of the fin-and-tube assembly 12 during a cooling cycle may be in a range of approximately −50° F.-+25° F., which is below the freezing point of water. Furthermore, "ice" is often defined as frozen water, and "frost" is often defined as frozen water vapor; consequently, "frost" is often defined as being a mixture of ice crystals and air, and as having a density of less than the density of ice. But herein, the term "frost" may refer to ice, frost, or a mixture of ice and frost. Furthermore, herein the term "frost" may also encompass ice, frost, or a mixture of ice and frost, that includes one or more contaminants (e.g., dirt).

Unfortunately, frost accumulated within the fin-and-tube assembly 12 may decrease the cooling efficiency of the fin-and-tube assembly, and thus may decrease the cooling efficiency of the entire cooling unit 10. Because the thermal conductivity of frost is significantly less than the thermal conductivity of metal and other materials from which the fin-and-tube assembly 12 may be made, accumulated frost may impede the transfer of heat from the air to the refrigerant via the fins and tubing. And the frost may also impede the flow of the air through the fin-and-tube assembly 12, thus reducing the rate at which the air flows through the fin-and-tube assembly, and thus further reducing the amount of heat that may transfer from the air to the refrigerant. And such a reduced cooling efficiency may require the cooling unit 10 to implement longer or more frequent cooling cycles, which may increase the energy consumption of, and thus reduce the energy efficiency of, the cooling unit for a given warehouse temperature.

And if left unchecked, an amount of frost sufficient to render the cooling unit 10 practically useless may accumulate in the fin-and-tube assembly 12.

To keep such a crippling amount of frost from accumulating, and, therefore, to maintain the cooling and energy efficiencies of the cooling unit 10 at acceptable levels, the controller 26 may periodically initiate a defrost cycle.

During a defrost cycle, the controller 26 causes at least some of the frost accumulated within the fin-and-tube assembly 12 to be removed by melting. For example, the controller 26 may activate the compressor assembly 22 and configure the valve assembly 20 such that hot compressed refrigerant flows through the tubing of the fin-and-tube assembly 12, and, thus, such that the heat from the hot refrigerant melts the frost. Or, the cooling unit 10 may have another assembly or mechanism (e.g., an electric heater) for melting the frost.

The controller 26 halts the defrost cycle at some point after initiating it, and techniques for determining when to halt the defrost cycle are discussed below.

Although defrost cycles may be needed to maintain the cooling and energy efficiencies of the cooling unit 10 at acceptable levels as discussed above, a defrost cycle itself may have undesirable consequences. For example, while the controller 26 is running a defrost cycle, the cooling unit 10 cannot operate to cool the space (e.g., warehouse). Depending on the conditions external to the space (e.g., a heat wave), this may allow the temperature of the space to rise above the temperature range for which the thermostat 24 is set. Furthermore, although a defrost cycle may increase the overall cooling and energy efficiencies of the cooling unit 10, it still may cause the cooling unit to consume a significant amount of energy, because not only does a defrost cycle itself consume energy, but after a defrost cycle is halted, the cooling unit also consumes energy to remove the heat added to the fin-and-tube assembly 12, the space, etc., during the defrost cycle.

Consequently, it may be desirable to minimize the rate at which the cooling unit 10 initiates a defrost cycle; that is, it may be desirable for the cooling unit to perform a defrost cycle only when the frost accumulation reaches a threshold level that may be predetermined based on, e.g., the application for which the cooling unit is used and the environment in which the space to be cooled is located.

Still referring to FIG. 1, there are a number of techniques for determining when to initiate a defrost cycle.

In one technique, an optical sensor (not shown in FIG. 1) generates a signal when the frost accumulation reaches a threshold level. But unfortunately, the optical sensor may become contaminated (e.g., "dirty"), and the contamination may cause the sensor to become an unreliable indicator of the frost-accumulation level. Consequently, the optical sensor may cause the controller 26 to initiate a defrost cycle too frequently or too infrequently.

In another technique, a current sensor (not shown in FIG. 1) monitors the current to the fan assembly 14, and indicates that the frost-accumulation has reached a threshold level when the current reaches a threshold current level. As discussed above, the more frost that has accumulated in the fin-and-tube assembly 12, the more the accumulated frost restricts the flow of air through the fin-and-tube assembly. As the restriction of the air flow increases, each fan of the fan assembly 14 encounter less rotating resistance, and, therefore, draws a lower current. Consequently, the level of current to the fan assembly 14 may be related to the level of frost accumulation, and, therefore, the level of current may be used to indicate the level of frost accumulation. But unfortunately, the current drawn by fan-assembly 14 may be an unreliable indicator of the frost-accumulation level. For example, in a cooling unit 10 having a fan assembly with multiple fan speeds, the controller 26 may be unable to accurately distinguish between a change in the fan-assembly current caused by a deliberate change in the fan speed or caused by a change in the frost-accumulation level. Or, the level of current to the fan assembly 14 may be affected by voltage fluctuations on the power grid supplied by the power company (i.e., the supply mains), and the controller 26 may be unable to accurately distinguish between a change in the fan-assembly current caused by a supply-mains voltage fluctuation or caused by a change in the frost-accumulation level. And there may be other factors unrelated to the frost-accumulation level that may cause a potentially indistinguishable change in the fan-assembly current.

In another technique, an airflow sensor (not shown in FIG. 1) monitors the rate of air flow through the fin-and-tube assembly 12. As discussed above, the more frost that has accumulated in the fin-and-tube assembly 12, the more the accumulated frost restricts the flow of air through the fin-and-tube assembly. Consequently, the rate of air flow through the fin-and-tube assembly 12 may be related to the level of frost accumulation, and, therefore, the rate of air flow may be used to indicate the level of frost accumulation. But unfortunately, the rate of air flow may be an unreliable indicator of frost-accumulation level. For example, in a cooling unit 10 having a fan assembly with multiple fan speeds, the controller 26 may be unable to accurately distinguish between a change in air flow caused by a deliberate change in the fan speed or caused by a change in the frost-accumulation level. Or, the rate of air flow through the fin-and-tube assembly 12 may be affected by changes in the fan speed caused by voltage fluctuations on the supply mains, and the controller 26 may be unable to accurately distinguish between a change in air-flow rate caused by a voltage fluctuation or caused by a change in the frost-accumulation level. And there may be other factors unrelated to the frost-accumulation level that may cause a potentially indistinguishable change in the air-flow rate.

In yet another technique for determining when to initiate a defrost cycle, temperature sensors (not shown in FIG. 1) at the input and discharge ports 16 and 18 may monitor the temperature differential between these two ports. As discussed above, the frost-accumulation level may affect the rate of air flow through the fin-and-tube assembly 12, and, thus, may affect the temperature differential such that as the frost-accumulation level increases, the temperature differential increases, and vice-versa. But this temperature-differential technique may be unreliable, for example, when the fan assembly has multiple fan speeds, because the controller 26 may be unable to accurately distinguish between a change in the temperature differential caused by a deliberate change in the air speed or caused by a change in the frost-accumulation level. Or, the temperature differential may be affected by changes in the fan speed caused by voltage fluctuations on the supply mains, and the controller 26 may be unable to accurately distinguish between a change in the temperature differential caused by a voltage fluctuation or caused by a change in the frost-accumulation level. And there may be other factors unrelated to the frost-accumulation level that may cause a potentially indistinguishable change in the temperature differential, such as fluctuations in the temperature of the refrigerant flowing through the tubing of the fin-and-tube assembly 12.

In still another technique, the cooling unit 10 may include a timer that records the total accumulated time during which the cooling unit is performing cooling cycles, and initiate a defrost cycle when the accumulated time reaches a threshold time that is thought to correspond to a threshold level of frost accumulation. But this technique may be relatively inefficient, because due to different conditions (e.g., humidity level) in the space being cooled, the frost-accumulation level may be different after one accumulated cooling period as compared to another accumulated cooling period. Consequently, after at least some accumulated cooling periods, the level of frost accumulation may be lower than the defrost-threshold level such that this technique may cause the cooling unit 10 to perform unnecessary defrost cycles.

In another technique, the controller 26 causes the cooling unit 10 to perform a defrost cycle at fixed preset intervals, for example, every six hours. But this technique may be relatively inefficient, because, as discussed above, due to different conditions (e.g., humidity level) in the space being cooled, the frost-accumulation level may be different after one interval as compared to another interval. Consequently, at least at some intervals, the level of frost accumulation may be lower than the defrost-threshold level such that this technique may cause the cooling unit 10 to perform unnecessary defrost cycles.

In another technique for determining when to initiate a defrost cycle, a sensor that is attached to and that surrounds the tubing of the fin-and-tube assembly 12 monitors a level of frost accumulation on a portion of the tubing, and generates a signal when the frost accumulation reaches a defrost-threshold level. An example of such a technique is disclosed in U.S. Pat. No. 7,466,146, which is incorporated by reference. But unfortunately, installing such a sensor may be impractical or impossible. In one technique for manufacturing the fin-and-tube assembly 12, the fins are machine-pressed onto the tubing; therefore, one typically cannot install such a sensor before the fins are installed. And because the pitch of the fins may be relatively high (e.g., 2-10 fins per inch), it may be difficult and impractical to install such a sensor after the fin-and-tube assembly 12 has been manufactured.

Still referring to FIG. 1, although a cooling unit 10 that suffers from frost accumulation is described, the above discussion may also be applicable to any type of cooling unit that may suffer from an accumulation of any type of frozen substance. For such a cooling unit, "defrost", as used herein, may generally refer to the partial or complete removal of any accumulated frozen substance, even a frozen substance other than ice or frost.

Discussed below in conjunction with FIGS. 2-21 are embodiments of techniques that may overcome at least some of the above-described problems, and that, therefore, may allow the initiation of a defrost cycle only when it is needed, e.g., only when the level of accumulation of a frozen substance in, e.g., a fin-and-tube assembly, equals or exceeds a threshold. Although, for example purposes, these embodiments are described in terms of air-cooling units that may suffer from frost accumulation, it is understood that the below discussion may also be applicable to any type of cooling unit that may cool any type of substance and that may suffer from an accumulation of any type of frozen substance. Furthermore, although the term "defrost" may be used, for example purposes, to refer to the partial or complete removal of accumulated ice or frost, it is understood that "defrost" may also generally refer to the partial or complete removal of any accumulated frozen substance. Furthermore, in FIGS. 2-21, like numbers may be used to refer to components that are common to multiple ones of the figures.

Referring to FIGS. 2-3, it has been discovered that a frozen substance such as frost may form in a cooling unit according to different patterns depending on the application and the cooling conditions (e.g., humidity levels and the set temperature range of the space to be cooled).

FIG. 2 is a plan view of a portion 30 of the fin-and-tube assembly 12 of the cooling unit 10 of FIG. 1, where the cooling unit maintains a space (e.g., a warehouse) at a temperature that is below freezing (32° F.). The fin-and-tube assembly 12 includes one or more sections 32 of tubing, and one or more cooling fins 34.

It has been discovered that at least in some freezer applications, the largest level of frost accumulation (i.e., the place where frost first accumulates, or where it accumulates the most) may occur along the edges 36 of the fins 34 adjacent to the intake port 16 (FIG. 1), and the frost accumulation may be in the form of frost columns 38 (in a dimension normal to the page of FIG. 2) that, in cross section (in the plane of FIG. 2 or in a plane parallel to the plane of FIG. 2), may be tear-drop or Q-tip® shaped. Also, in a dimension normal to the page of FIG. 2, the columns 36 may tend to be thicker in their regions closest to a section 32 of tubing, and may tend to be narrower in their regions farthest from a section of tubing. Although frost may accumulate in other regions of the portion 30 of the fin-and-tube assembly 12 and in portions of the fin-and-tube assembly outside of the portion 30, such accumulation is omitted from FIG. 2 for clarity.

FIG. 3 is a plan view of a portion 40 of the fin-and-tube assembly 12 of the cooling unit 10 of FIG. 1, where the cooling unit maintains a space (e.g., a warehouse) at a temperature that is above or below freezing (32° F.).

It has been discovered that, contrary to conventional wisdom, at least in some refrigerator applications the largest level of frost accumulation (i.e., the place where frost first accumulates, or where it accumulates the most) may occur at the junctions 42 of the sections 32 of tubing and the fins 34 closest to the discharge port 18 (FIG. 1), and the frost accumulation may be in the form of frost "donuts" 44 that encircle the respective sections 32 of tubing, and that, in cross section, may be shaped as two back-to-back trapezoids having an axis of symmetry lying in the plane of the respective fin 34. Also, along a radius that extends in the plane of the respective fin 34 from the center axis of the respective section 32 of tubing, each donut 44 may tend to be thicker toward its center, which is nearest the respective section of tubing, and may thin out with increasing distance from the center, i.e., may thin out with increasing distance from the tubing. Although frost may accumulate in other regions of the portion 40 of the fin-and-tube assembly 12 and portions of the fin-and-tube assembly outside of the portion 40, such accumulation is omitted from FIG. 3 for clarity.

FIG. 4 is block diagram of an embodiment of a cooling system 50 having multiple cooling units 10 (the cooling units need not be identical to one another). The arrows indicate example air-circulation paths for each cooling unit 10.

In addition to the cooling units $10_1$-$10_n$, the system 50 includes a conveyor assembly 52 for transporting at least one item 54 (e.g., food) to be cooled or frozen from an entrance 56, past the cooling units, to an exit 58. The conveyor assembly includes a conveyor belt 59 that is perforated or that is otherwise constructed to allow air to pass through the belt.

In operation, the cooling system 50 cools each item 54 to within a desired temperature range by progressively cooling each item as it passes from cooling unit 10 to cooling unit 10. An item 54 enters the cooling system 50 via the entrance 56 and moves to a first cooling unit $10_1$, and the first cooling unit reduces the temperature of the item. Then, the item 54 moves from the first cooing unit $10_1$ to a second cooling unit $10_2$, and the second cooling unit further reduces the temperature of the item. Each subsequent cooling unit 10 further reduces the temperature of the item 54 such that when the item leaves the system 50 via the exit 58, the temperature of the item is within a desired range.

It has been discovered that, contrary to conventional wisdom, frost may accumulate at different rates, and with different patterns, from cooling unit 10 to cooling unit 10. Therefore, causing each of the cooling units 10 to perform a defrost cycle with the same frequency may render the system 50 relatively inefficient, even if the cooling units 10 perform their defrost cycles at staggered intervals. For example, causing each cooling unit 10 to perform a defrost cycle with the frequency desired for the one of the cooling units having the highest frost-accumulation rate may cause the other cooling units to perform unnecessary defrost cycles.

Figure 5:
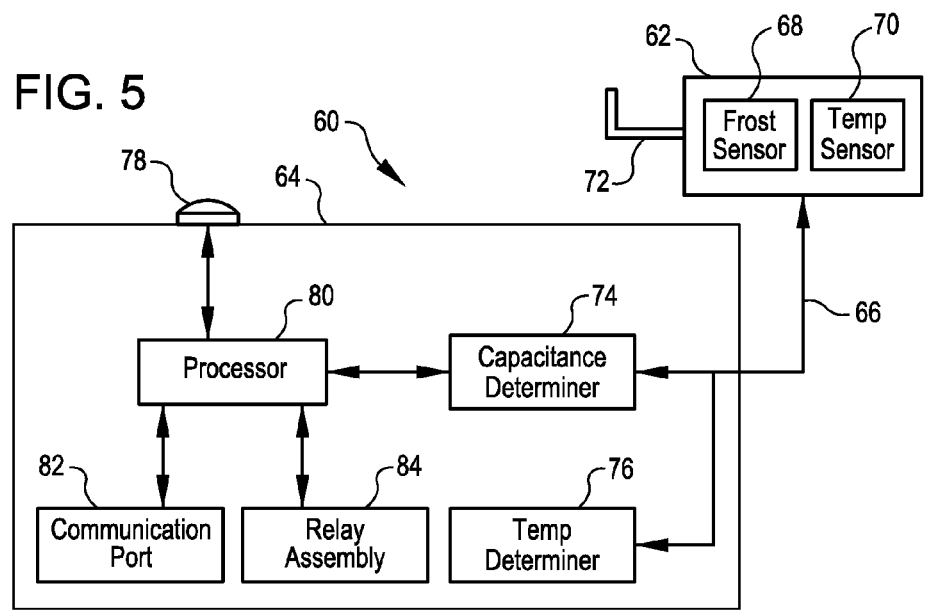
FIG. 5 is a block diagram of an embodiment of a frozen-substance detection unit.

FIG. 5 is a block diagram of an embodiment of a defrost-condition detection unit 60, which may provide a reliable indication of when a level of frost accumulation is sufficient to warrant a defrost cycle, and which may, therefore, allow an increase in the cooling and energy efficiencies of a cooling unit, such as the cooling unit 10 of FIG. 1, that incorporates the defrost-condition detection unit. The defrost-condition detection unit 60 may allow this increase in efficiencies by reducing the number of, or by altogether eliminating, unnecessary defrost cycles.

The defrost-condition detection unit 60 includes a defrost probe 62 and a defrost detector 64, which is coupled to the probe via an electrical-signal cable 66. Alternatively, the detector 64 may be coupled to the probe 62 in another manner, such as by a fiber-optic cable or via a wireless channel, in which case the probe and detector may each include a respective wireless transceiver.

The probe 62 includes a frost sensor 68, a temperature sensor 70, and a support mount 72.

The frost sensor 68, which may be a capacitance sensor as discussed below, is operable to generate a signal that is indicative of a level of frost accumulation on at least one cooling fin 34 of the fin-and-tube assembly 12 (FIGS. 1-3). For example, the frost sensor 68 may be a capacitance sensor AD7747 manufactured by Analog Devices.

The temperature sensor 70 is operable to generate a signal that is indicative of the temperature in the vicinity of the probe 62. For example, the temperature sensor 70 may be a solid state AD590 manufactured by Analog Devices, or may be incorporated into the capacitance sensor AD7747, which is also manufactured by Analog Devices per above.

And the support mount 72 is operable to hold the frost and temperature sensors 68 and 70 in a desired location within the fin-and-tube assembly 12 (FIGS. 1-3). For example, as discussed below, the support mount 72 may hold the sensors 68 and 70 to at least one fin 34 (FIGS. 1-3) of the fin-and-tube assembly 12.

Still referring to FIG. 5, the defrost detector 64 includes a capacitance determiner 74, a temperature determiner 76, a calibration input device 78, a processor 80, a communication port 82, and a relay assembly 84.

The capacitance determiner 74 is operable to receive the signal from the frost sensor 68, and, in response to the signal, is operable to determine a value of a capacitance between the frost sensor and another item, e.g., a cooling fin, where frost accumulates between the frost sensor and the other item. The operation of the capacitance determiner 74 is further described below in conjunction with FIGS. 6-9.

The temperature determiner 76 is operable to receive the signal from the temperature sensor 70, and, in response to the signal, is operable to determine the temperature in the vicinity of the temperature sensor, which may be in the vicinity of a section 32 of tubing, or in the vicinity of a fin 34, of the fin-and-tube assembly 12 (FIGS. 1-3), for example in the vicinity of a frost column 38 (FIG. 2) or frost donut 44 (FIG. 3). For example, as discussed below, the temperature sensor 70 may provide an indication of when a defrost cycle may be halted.

The calibration input device 78 may allow calibration of a capacitance value associated with a defrost-initiate threshold level of frost accumulation. For example, the device 78 may be a push button, and a human operator may manually monitor the level of frost accumulation in the vicinity of the frost sensor 68, and may push the button when he/she would like to set the defrost-initiate threshold level to the current level of frost accumulation.

The processor 78 is operable to receive the determined capacitance from the capacitance determiner 74, and, from the determined capacitance, is operable to determine when a level of frost accumulation in the fin-and-tube assembly 12 (FIGS. 1-3) equals or exceeds the defrost-initiate threshold level. And if the processor 78 determines that the level of frost accumulation equals or exceeds the defrost-initiate threshold level, it may generate a defrost-initiate signal to indicate to the controller 26 (FIG. 1) that the cooling unit 10 (FIG. 1) is ready for defrosting.

The processor 80 is also operable to receive the determined temperature from the temperature determiner 76, and, from the determined temperature, is operable to take an action such as to determine when a level of frost melting/removing equals or exceeds a defrost-halt threshold level. And if the processor 80 determines that the level of frost removal equals or exceeds a defrost-halt threshold level, it may generate a defrost-halt signal to indicate to the controller 26 (FIG. 1) that the cooling unit 10 (FIG. 1) is ready to exit a defrost cycle.

The communication port 82 allows the processor 80 to communicate with other components of the cooling unit 10 (FIG. 1), to other components of a system in which the cooling unit is installed, or to a computer or other device accessible via a local area network (LAN) or via the internet. For example, the processor 80 may send the defrost-initiate and defrost-halt signals to the controller 26 of FIG. 1 via the communication port 82, and may be programmable or updatable over the internet via the communication port. The port 82 may be any type of suitable port such as a serial port.

The relay assembly 84 may provide the processor 80 with an alternate way to generate one or both of the defrost-initiate and defrost-halt signals. For example, the processor 80 may activate a first relay within the relay assembly 84 to generate the defrost-initiate signal, and may activate a second relay within the relay assembly to generate the defrost-halt signal. The processor 80 may also use the relay assembly 84 to generate other signals.

Still referring to FIG. 5, alternate embodiments of the defrost-condition detection unit 60 are contemplated. For example, the unit 60 may include components in addition to the described components, or may omit one or more of the described components. Furthermore, although described as detecting a level of frost accumulation, the unit 60 may detect a level of accumulation of a frozen substance other than frost. Moreover, functions attributed to one or both of the capacitance determiner 74 and the temperature determiner 76 may be performed by the processor 80, or vice-versa, and any of these functions may be performed in hardware, software, or a combination of hardware and software.

Figure 6:
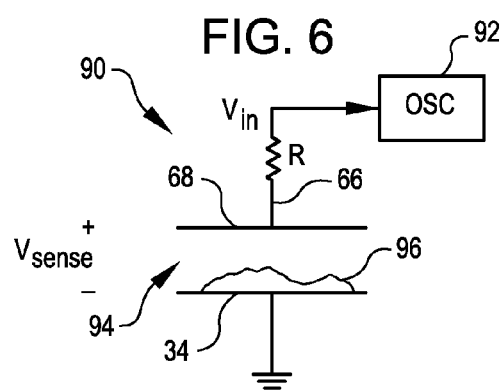
FIG. 6 is a schematic diagram of an embodiment of a capacitance-detection circuit that the capacitance determiner of FIG. 5 may incorporate.

FIG. 6 is a schematic diagram of an embodiment of an equivalent circuit 90 that may be implemented by the frost sensor 68 and the capacitance determiner 74 of FIG. 5. The capacitance determiner 74 includes an oscillator 92 that generates a signal, such as a square wave or sinusoid, having a frequency f and an amplitude Vin, and includes a resistance R coupled to the oscillator 92. The cable 66 couples the resistance R to the frost sensor 68, which forms one plate of a capacitor 94. Another conductive object—the cooling fin 34 in this example—is coupled to a reference voltage such as ground so that the other object forms another plate of the capacitor 94. And frost 96 accumulates between the frost sensor 68 and the cooling fin 34, for example, on a side of the cooling fin facing the frost sensor.

Referring to FIGS. 5 and 6, an embodiment of a technique for measuring a level of frost accumulation using a capacitance measurement is described.

A voltage $V_{sense}$ across the capacitor 94 may be given by the following equation:

$$Vsense = Vin \cdot \frac{\frac{1}{sC}}{R + \frac{1}{sC}} = \frac{1}{sCR + 1} \quad (1)$$

where in a steady state, $s = j2\pi f$.

Furthermore, the capacitance C for a parallel-plate capacitor may be given by the following equation:

$$C = \varepsilon_0 \varepsilon_r \frac{A}{d} \quad (2)$$

where $\varepsilon_0$ is a known constant, $\varepsilon_r$ is the effective dielectric constant of the material(s) (e.g., the accumulated frost 96 and the air) between the two plates (e.g., the frost sensor 98 and the cooling fin 34) of the capacitor 94, A is the area of each plate, and d is the distance between the two plates.

When no frost 96 is present, then only air is between the frost sensor 68 and the cooling fin 34, and, therefore, the capacitor 94 has a capacitance that corresponds to zero frost accumulation.

But because the frost 96 has a dielectric constant $\varepsilon_r$ greater than that of air ($\varepsilon_r$ for air is approximately 1), as the frost accumulates, the effective dielectric constant of the capacitor 94 increases, thus increasing the capacitance C and decreasing the amplitude of the voltage $V_{sense}$ according to equation (1).

Therefore, because $V_{sense}$, R, and f are known, the capacitance determiner 74 may calculate the capacitance C of the capacitor 94 per equation (1).

And, as discussed above, an operator may use the calibration input device 78 to set the value of the capacitance C that corresponds to the level of frost accumulation that he/she selects to be the defrost-initiate threshold level of frost accumulation. Therefore, in response to the capacitance determiner 74 indicating that the capacitance C is approximately equal to or greater than capacitance value corresponding to the defrost-initiate threshold, the processor 80 may generate a defrost-initiation signal to the controller 26.

Still referring to FIG. 6, other embodiments of the equivalent circuit 90 and of the described frost-measuring technique are contemplated. For example, one may substitute the resistance R with another impedance such as another capacitor. Furthermore, one may use a different technique for calibrating the defrost-initiate threshold (such a different technique is described below). In addition, although described as accumulating on the fin 34, an embodiment of the above-described technique may be applicable even where the frost 96 accumulates on the sensor 68, or accumulates on both the fin and sensor. Moreover, the described technique may be used to detect the accumulation of frozen substances other than frost. In addition, because the dielectric constant $\varepsilon_r$ for frost (and may be other substances) may vary with the frequency f, the capacitance value corresponding to the defrost-initiate threshold may also vary with the frequency f.

FIG. 7 is a plan view of an embodiment of the probe 62 of FIG. 5 attached to a cooling fin 34. The support member 72 holds the probe 62 in between (e.g., approximately half way between) two adjacent cooling fins 34a and 34b, where a first capacitor 100 is formed by the cooling fin 34a and the frost sensor 68, and a second capacitor 102, which is in electrical parallel with the first capacitor (both of the cooling fins are at approximately the same voltage potential, e.g., ground), is formed by the cooling fin 34b and the frost sensor. The two parallel capacitors 100 and 102, form, at least theoretically, a single capacitor having a capacitance equal to the sum of the capacitances of the capacitors 100 and 102. Therefore, although there are two parallel capacitors 100 and 102, the general operation of the defrost-condition detection unit 60 (FIG. 5), at least in terms of measuring capacitance as an indicator of frost thickness, is similar to that described above in conjunction with FIG. 6 for a single capacitor; and the same may be true even if the capacitors 100 and 102 are in series.

Referring to FIGS. 1, 3, and 5-7, the operation of an embodiment of the defrost-condition detection unit 60 of FIG. 5 is described.

After attaching the probe 62 to the fin 34a, an operator makes sure that the fins 34a and 34b, at least in the vicinity of the probe 62, are relatively free of dirt, water, and other contaminants. After the operator determines that the fins 34a and 34b are relatively free of contaminants, the operator causes the capacitance determiner 74 to measure an initial, baseline, capacitance $C_{base}$ of the probe-fin structure, and causes the processor 80 to store the value of $C_{base}$ in, e.g., a memory on board the detector 64 (memory not shown in FIGS. 1, 3, and 5-7).

Next, the operator allows the cooling-unit controller 26 to initiate a cooling cycle of the cooling unit 10 to which the fins 34a and 34b belong. During the cooling cycle, the controller 26 activates the compressor 22 and causes the valve assembly 20 to route expanding refrigerant into the tubing 32 as discussed above in conjunction with FIG. 1.

Then, the operator periodically checks the level of accumulation of the frost 96 on the fins 34a and 34b. When the frost accumulation reaches a level at which the operator wants the processor 80 indicate that the cooling unit 10 is ready for a defrost cycle (e.g., by generating a defrost-initiate signal), the operator activates the calibration input device 78, e.g., by pushing a button, such that the calibration device generates a calibration signal to the processor.

In response to the signal from the calibration input device 78, the processor 80 stores the then-current value of the capacitance C from the determiner 44 as a frost-thickness threshold capacitance value $C_{FTF}$.

Thereafter, the processor 80 generates a defrost-initiation signal in response to the capacitance determiner 74 indicating that the capacitance C of the capacitor formed by the fins 34a and 34b and frost sensor 68 is equal to or greater $C_{FTF}$.

Because during a defrost cycle, and for a period of time after a defrost cycle, the capacitance sensed by the capacitance sensor 68 may not be an accurate indication of a thickness of accumulated frost, the processor 80 typically ignores the sensed capacitance during a defrost cycle, and for a period of time after the defrost cycle has been halted (the controller 26 of FIG. 2 may notify the processor when the defrost cycle is halted). For example, water remaining on and between a fin 34 and the capacitance sensor 68 after a defrost cycle may cause the sensed capacitance to be greater than $C_{FTF}$, and to thus falsely indicate the need for a defrost cycle, even though a defrost cycle has just been completed. Therefore, such a potentially false reading, and the initiating of an unneeded defrost cycle, may be avoided by the processor 80 waiting a period of time (e.g., from approximately 10 minutes to multiple hours) before beginning to again monitor the thickness of the accumulated frost.

The processor 80 then continues to monitor the level of frost accumulation between the sensor 68 and the fins 34a and 34b, and to periodically generate defrost-initiation signals in the above-described manner.

Consequently, the defrost-condition detection unit 60 allows the controller 26 to initiate a defrost cycle only when the accumulation of the frost 96 is at a predetermined threshold level. This may increase the cooling and energy efficiencies of the cooling unit 10, may save money, and may increase the time that the cooling unit is available for cooling the space to be cooled.

Still referring to FIGS. 1, 3 and 5-7, in an embodiment, the frost detector 64 may implement an automatic calibration of the threshold capacitance value $C_{FTF}$ according to the following equation:

$$C_{FTF} = C_{no\_acc} + (C_{no\_acc} - C_{offset}) \cdot (TH_{acc\_width} \cdot D_{frozen\_substance} \cdot \in_{r\_frozen\_substance}) \quad (3)$$

where $C_{offset}$ is the capacitance sensed by the capacitance sensor 68 when remote from the fin(s) 34, $C_{no-acc}$ is the capacitance sensed by the capacitance sensor when positioned near at least one fin 34 in the absence of an accumulation of the frozen substance (e.g., frost), $TH_{acc\text{-}width}$ is the threshold width of the frozen substance at which it is desired to initiate a defrost cycle relative to the distance(s) between the capacitance sensor and the fin(s), $D_{frozen\_substance}$ is the density of the frozen substance relative to the density of the frozen substance with no air mixed in, and $\in_r$ is the dielectric constant of the frozen substance with no air mixed in.

For example, assume that the frozen material is frost, the sensor 68 is halfway between the fins 34a and 34b (FIG. 7), it is desired to initiate a defrost cycle when the frost accumulates to 50% of the distance between the sensor and the fin 34a and to 50% of the distance between the sensor and the fin 34b, $C_{offset}$ is determined to be 10 pF, and $C_{no\text{-}acc}$ is determined to be 14 pf. Because the density of frost is about 0.12 the density of solid ice, and $\in_{r\_ice}$ is approximately 5.0, then $C_{FTF}$ is approximately 15.2 pF per equation (3). That is, when the processor 80 receives a capacitance measurement indicating an increase of 1.2 pF from the no-accumulation capacitance of 14 pF, the processor generates a defrost-initiation signal.

By automatically calibrating $C_{FTF}$, the detector 64 may eliminate the need for an operator to actually enter the cooling unit 10 to periodically check the thickness of the accumulated frost, and to activate the calibration input device 78 (e.g., push a button) when the frost reaches the desired defrost-initiate threshold thickness.

Still referring to FIGS. 3 and 5-7, in another embodiment wherein the probe 62 includes the temperature sensor 70, the detector 64 may also generate an indication that a defrost cycle is ready to be halted.

As discussed above, during a defrost cycle, the sections 32 of tubing and the cooling fins 34 may be heated (e.g., by an electric heater or by routing hot refrigerant through the sections 32) to melt the accumulated frost.

Because frozen-substance remains at its phase-change temperature (i.e., the temperature at which the substance transitions from a solid phase to a liquid phase) until substantially all of the substance has been melted, the processor 80 may detect when substantially all of the frozen substance has melted by monitoring the temperature at the temperature sensor 70 via the temperature determiner 76. Consequently, when the temperature begins to increase beyond the phase-change temperature of the substance, the processor 80 may generate a signal indicating that the defrost cycle is ready to be halted.

For example, assume that the frozen substance is frost, and that during a defrost cycle, the controller 26 causes the valve assembly 20 to route hot refrigerant through the sections 32 of tubing. Consequently, because the temperature sensor 70 is near the accumulated frost 96, while the accumulated frost is melting, the temperature sensed by the processor 80 via the temperature sensor and the temperature determiner 76 is approximately 32° F., which is the solid-to-liquid phase-change temperature of water. When the processor 80 senses that the temperature at the sensor 70 is rising, or has risen, above a defrost-halt threshold temperature, e.g., 40° F., then the processor may generate a defrost-halt signal, in response to which the controller 26 may halt the defrost cycle by causing the valve assembly 20 to cease routing the hot refrigerant through the sections 32 of tubing.

FIG. 8 is a plan view of the embodiment of FIG. 7, where a change in conditions may affect the measurement of an accumulation of a frozen substance (no accumulation shown in FIG. 8).

The ability of the capacitance threshold value $C_{FTF}$ to reliably indicate when a thickness of an accumulated frozen substance has reached a defrost-threshold thickness may be compromised when conditions that affect the capacitance between the capacitance sensor 68 and the fin(s) 34 change over time. Such a change in conditions may be caused by, e.g., contaminants such as dirt that forms on the fin(s) 34 or sensor 68, ice that remains on the fin(s) or sensor after a defrost cycle, or a change in the spacing between a fin and the sensor caused by, e.g., frost heaving.

Therefore, the defrost-condition detection unit 60 (FIG. 5) may perform an auto-zeroing operation to track the frozen-thickness-threshold capacitance value $C_{FTF}$ to such changes in conditions. Such tracking of $C_{FTF}$ may allow the defrost-condition detection unit 60 to continue to accurately indicate when an accumulation of frozen material has reached a defrost threshold level even in the presence of conditions that may affect the zero-accumulation capacitance level.

Referring to FIGS. 5 and 8, an embodiment of such an auto-zeroing operation is discussed. For example purposes, it assumed that a change in conditions is caused at least in part by a piece 110 of ice formed on the fin 34a, between the fin and the capacitance sensor 68, from a drop of water remaining after a defrost cycle. It is understood, however, that the procedure may be similar for frozen substances other than frost and for changes in conditions having causes other than a frozen drop of water remaining after a defrost cycle.

After installing the probe 62 between the fins 34a and 34b, the processor 80 stores a starting capacitance $C_{no\text{-}acc}$, which, as discussed above, is the capacitance sensed by the capacitance sensor 68 when there is no accumulation of frost between the fin(s) 34 and the capacitance sensor. The processor 80 may store $C_{no\_acc}$ in a memory (not shown in FIG. 5 or 8) on board or external to the processor.

Next, the processor 80 determines an initial value $C_{FTF\_initial}$ for $C_{FTF}$, for example, by the manual or automatic calibration procedure described above in conjunction with FIGS. 1, 3 and 5-7.

Then, the processor 80 determines and stores a difference capacitance $C_{diff} = C_{FTF\_initial} - C_{no\_acc}$, where $C_{diff}$ is the change in capacitance caused by an accumulation of frost reaching a defrost-initiation threshold thickness. For example, if $C_{FTF\_initial} = 20$ pF and $C_{no\_acc} = 15$ pF, then $C_{diff} = 5$ pf is the amount of additional capacitance caused by the accumulation of frost having the defrost-initiation threshold thickness.

It has been discovered that $C_{diff}$ remains approximately constant even in view of changing conditions. That is, whatever changes may occur to the starting capacitance $C_{no\_acc}$, it is assumed that an accumulation of frozen material equal to the defrost-initiation thickness always adds approximately $C_{diff}$ to the starting capacitance.

Next, after waiting a suitable delay time after the first defrost cycle has completed (as discussed above, the delay time allows, for example, post-defrost water remaining on the fins 34 or sensor 68 to dissipate, but is not so long as to allow the accumulation of a significant amount of frost between the fins and sensor), the processor 80 re-measures the starting capacitance $C_{no\_acc}$, and stores this updated value for $C_{no\_acc}$ and discards the previous value of $C_{no\_acc}$.

Then, the processor 80 generates an updated value for $C_{FTF}$ equal to the sum of the updated value for $C_{no\_acc}$ and the previously stored value for $C_{diff}$. In this way, the processor 80 effectively "zeros out" the affect that any changes to $C_{no\_acc}$ may have on $C_{FTF}$.

Because a change in $C_{no\_acc}$ may be caused by a frozen water drop 110 per above, and because ice may sublimate, the processor 80 periodically re-measures $C_{no\_acc}$ over a calibration period, but updates the stored value of $C_{no\_acc}$ only if the measured value of $C_{no\_acc}$ is less than the stored value of $C_{no\_acc}$. In more detail, the frozen water drop 110 may cause $C_{no\_acc}$ to increase as compared to the value $C_{no\_acc}$ would have in the absence of the frozen water drop, because $\in_{r\_ice}$ is greater than $\in_{r\_air}$. But over time, the frozen drop 110 may transition directly from ice into water vapor by a process known as sublimation, in which a solid transitions directly into a gas without first going through the liquid phase. Because such sublimation of the drop 110 may occur before a significant level of frost accumulates between the fins 34 and the capacitance sensor 68, such sublimation may lower the value of $C_{no\_acc}$. Therefore, by periodically monitoring $C_{no\_acc}$, but updating $C_{no\_acc}$ to the measured capacitance only if the measured capacitance is lower than the stored value of $C_{no\_acc}$, the processor 80 may account for sublimation (and possibly other time-varying affects on the starting capacitance) without risking changing the value of $C_{no\_acc}$ in response to changes in capacitance caused by an accumulation of frost.

Furthermore, it is pointed out that even if the frozen drop 110 does not sublimate, and thus effectively becomes part of an accumulation of frost, zeroing out the affect of the frozen drop on $C_{no-access}$ does not cause a significant change in the defrost-initiate thickness of the accumulated frost. The drop 110 is a local artifact relative to the sensor 68. Therefore, although such auto-zeroing of $C_{no\_access}$ may cause the defrost-initiate thickness of frost between the fin 34a and the sensor 68 to be greater than the defrost-initiate threshold thickness, in other regions of the fin-and-tube assembly 12 (FIG. 1) where no frozen water drops are present, the thickness of the accumulated frost at the time that the processor 80 generates a defrost-initiation signal may still be approximately equal to the defrost-initiation threshold thickness.

The processor 80 may perform such an auto-zeroing routine after each defrost cycle, or after some, but not all, defrost cycles.

Referring to FIGS. 1-8, in summary, by reducing the rate at which a cooling unit 10 performs a defrost cycle, for example, by initiating a defrost cycle only when the thickness of accumulated frost reaches a predetermined threshold level, one may significantly improve the energy efficiency of the cooling unit with little or no decrease in the cooling unit's cooling efficiency.

And if an embodiment of the described defrost-condition detection techniques were implemented in every cooling unit in the United States, the energy savings, and the corresponding cost savings, reduced burden on the power grid, and reduced level of carbon emissions, are estimated to be significant.

For example, consider that there are over 1,500 refrigerated warehouses (that keep spaces at above or below freezing) in the U.S., with an estimated total of 3.156 billion cubic feet of refrigerated space using an estimated 631,200 Tons Refrigeration, a defrost cycle consumes, on average, approximately 0.37 kilowatt hour (kWh) per Ton Refrigeration; in an annual total consumption of approximately 340,974,240 kWh to defrost these cooling units.

Furthermore assume that on average, each of the cooling units for these warehouses performs a defrost cycle every six hours, or four times per day. This results further assume that if these cooling units employed an embodiment of the described defrost-condition detection techniques, then they could, on average, reduce the number of defrost cycles by at least 25%. In fact, it has been discovered that in at least some applications, the defrost rate may be reduced by significantly more than 25%. For example, in some applications, it has been discovered that a cooling unit may need to initiate a defrost cycle as infrequently as once per week or even less frequently; this corresponds to a possible reduction in the average defrost rate of over 95% for such applications. Therefore, a reduction of 25% in the average defrost rate is considered to be a conservative estimate.

Consequently, a 25% reduction in the rate of refrigerated-warehouse defrost cycles would conserve approximately 33.2 million kWh and would eliminate approximately 110 million pounds of $CO_2$ emissions annually in the U.S. alone!

And this estimate is for refrigerated warehouses in the U.S. only. If other types of cooling units (e.g., cooling units for HVAC systems, supermarket refrigerators/freezers, home refrigerators/freezers) were to employ an embodiment of the described defrost-condition detection techniques, and if regions outside of the U.S. are also considered, then the potential savings in power consumption and carbon emissions are even greater!

Still referring to FIG. 1-8, alternate embodiments of the above-described described apparati and techniques are contemplated. For example, although many of these apparati and techniques are described in terms of air-cooling units and frost accumulation, these apparati and techniques may be similar for cooling units other than air-cooling units, and for accumulations of frozen substances other than frost. Furthermore, the probe 62 may allow the processor 80 to determine a parameter of a frozen substance other than thickness. Moreover, although shown mounted near the edges of the cooling fins 34, the probe 62 may be mounted at other locations within or outside of the fin-and-tube assembly 12.

Figure 9:
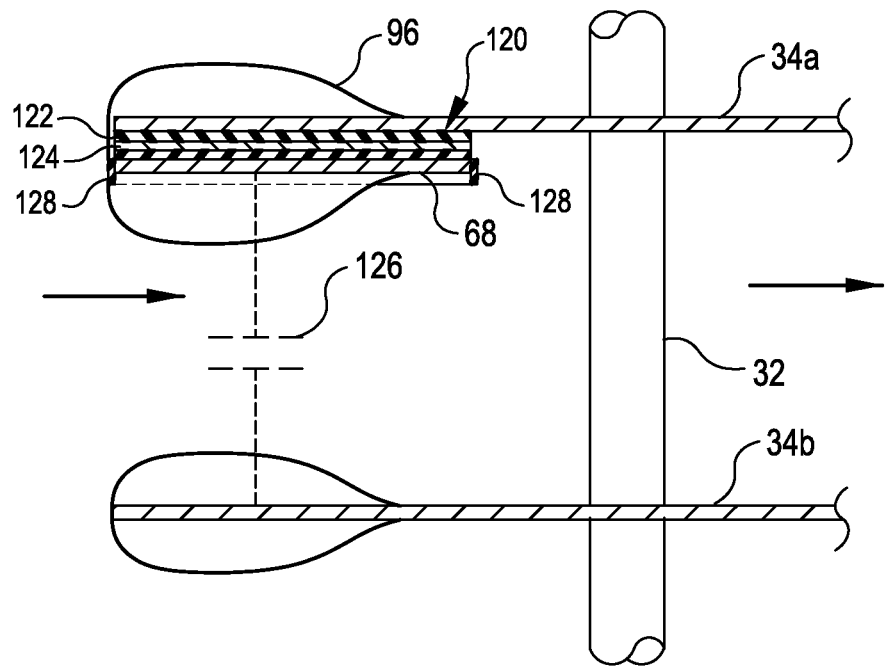
FIG. 9 is a plan view of another embodiment of a frozen-substance probe attached to a fin of a cooling unit, where on the fin is an accumulation of a frozen substance.

FIG. 9 is a plan view of an embodiment of a probe 120 attached to a cooling fin 34a. Like the probe 62 of FIG. 5, the probe 120 includes a capacitance sensor 68 and may include a temperature sensor 70 (not shown in FIG. 9). But the probe 120 is attachable to the cooling fin 34a with a support 122 that may be bonded, bolted, or otherwise attached to the fin, where such attachment may allow the temperature sensor 70, if present, to more accurately measure the temperature of the cooling fin 34a or the accumulated frozen material 96 during a defrost cycle or during another period. The probe 120 may also include a shield 124, which may be formed from an electrically conductive material, and which may allow the capacitance sensor 68 to approximately sense only a capacitance 126 between the capacitance sensor and the cooling fin 34b. Examples of the shield 124 are disclosed in U.S. Pat. No. 7,466,146, which was previously incorporated by reference. For example, the defrost detector 64 (FIG. 5) may apply a voltage to the shield 124, the voltage being approximately the same as the voltage that the detection unit applies to the capacitance sensor 68. Consequently, because there is a net zero voltage between the sensor 68 and the shield 124, the capacitance value of a capacitor formed by the sensor (one plate of the capacitor) and the shield (the other plate) is approximately zero, and thus this capacitor has little or no influence on the capacitance 126 between the sensor and the fin 34b as measured by the sensor. The operation of the defrost-condition detection unit 60 with the probe 62 replaced with the probe 120 is similar to that described above in conjunction with FIGS. 1, 3, and 5-7.

Alternative embodiments of the probe 120 are contemplated. The probe 120 may have a structure that is different from that described above. For example, the probe 120 may have multiple shields 124, or may have a guard-ring shield 128 electrically insulated from, and disposed around, the sensor 68. Furthermore, the probe 120 may be operable to allow the processor 80 (FIG. 5) to determine a thickness of a frozen substance other than water, or to obtain information on a parameter of the frozen substance other than thickness. Moreover, the probe 120 may be mounted near edges of the fins, or in the interior of the fin-and-tube assembly 12 (FIG. 1).

Figure 10:
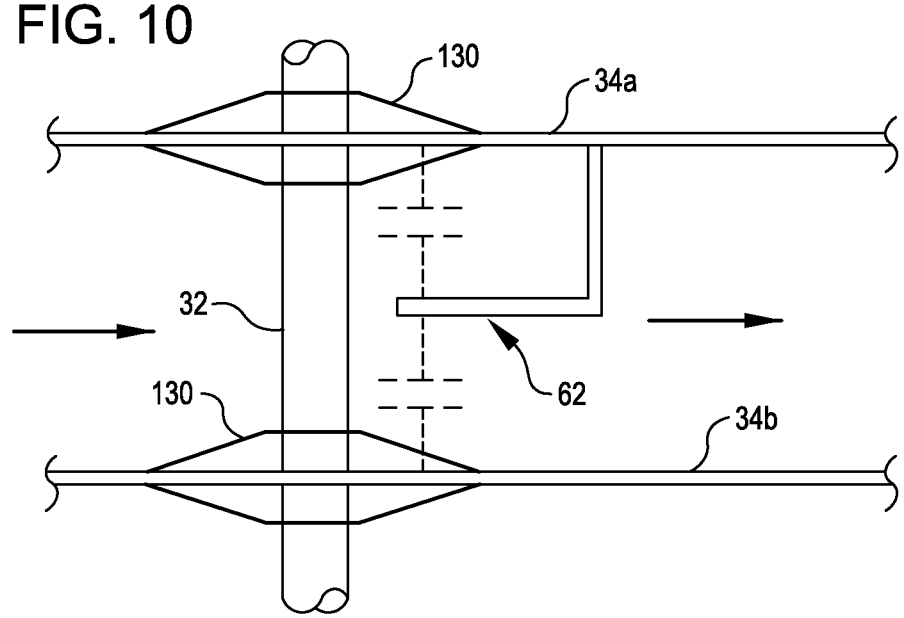
FIG. 10 is a plan view of an embodiment of the frozen-substance probe of FIG. 7 attached to a fin of a cooling unit, where the pattern of frozen-substance accumulation on the fin is different from the pattern of frozen-substance accumulation in FIG. 7.

FIG. 10 is a plan view of an embodiment of the probe 62 (FIG. 5) attached to a cooling fin 34a of a cooling unit 10 (FIG. 1) installed in a refrigeration system, where the pattern of accumulated frost 130 is similar to the pattern described above in conjunction with FIG. 3. The operation of the defrost-condition detection unit 60 may be similar to that described above in conjunction with FIGS. 1-3 and 5-7 even though the frost pattern is different than the frost pattern described above in conjunction with FIG. 7.

Alternative embodiments of the probe 62 are contemplated. For example, the probe 62 may have a structure that is different from that described above. For example, one or more alternative embodiments described above in conjunction with FIG. 9 for the probe 120 may be applicable to the probe 62.

Figure 11:
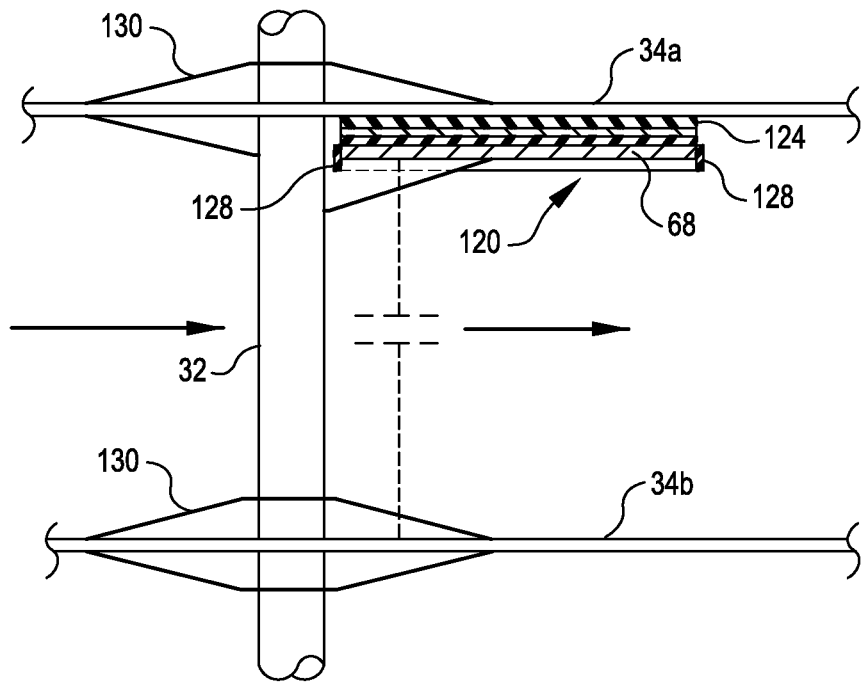
FIG. 11 is a plan view of an embodiment of the frozen-substance probe of FIG. 9 attached to a fin of a cooling unit, where the pattern of frozen-substance accumulation on the fin is different from the pattern of frozen-substance accumulation in FIG. 9.

FIG. 11 is a plan view of an embodiment of the probe 120 (FIG. 9) attached to a cooling fin 34a of a cooling unit 10 (FIG. 2) installed in a refrigeration system, where the pattern of accumulated frost 130 is similar to the patterns described above in conjunction with FIGS. 3 and 10. The operation of the defrost-condition detection unit 60 where the probe 120 replaces the probe 62 may be similar to that described above in conjunction with FIGS. 1-3 and 5-7, even though the frost pattern is different than the frost pattern described above in conjunction with FIGS. 2 and 7.

Alternative embodiments of the probe 120 are contemplated. For example, the probe 120 may have a structure that is different from that described above. For example, one or more alternative embodiments described above in conjunction with FIGS. 9-10 for the probes 62 and 120 may be applicable to the probe 120 of FIG. 11.

Figure 12:
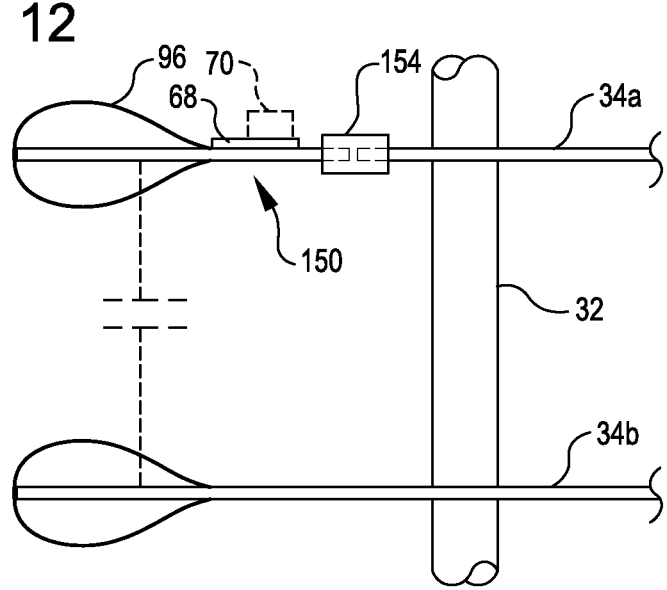
FIG. 12 is a plan view of another embodiment of a frozen-substance probe.

FIG. 12 is a plan view of an embodiment of a probe 150 attached to a cooling fin 34a of a cooling unit 10 (FIG. 1) installed in a freezer system, where frost 96 accumulates in a pattern similar to the pattern described above in conjunction with FIG. 2. The capacitance sensor 68 is aligned with, yet electrically insulated from, the fin 34a via an insulator 154, and the sensor may be, for example, a piece of fin that fits into the insulator. The temperature sensor 70 may be attached to the capacitance sensor 68 (shown in FIG. 12), or to a portion of the fin 34a on an opposite side of the insulator 154 from the capacitance sensor. The operation of the defrost-condition detection unit 60 where the probe 150 replaces the probe 62 may be similar to that described above in conjunction with FIGS. 1-3 and 5-7.

Alternative embodiments of the probe 150 are contemplated. The probe 150 may have a structure that is different from that described above. For example, the capacitive sensor 68 may be attached to the fin 34a by other than the insulator 154. Furthermore, one or more alternative embodiments described above in conjunction with FIGS. 9-11 for the probes 62 and 120 may be applicable to the probe 150.

Figure 13A:
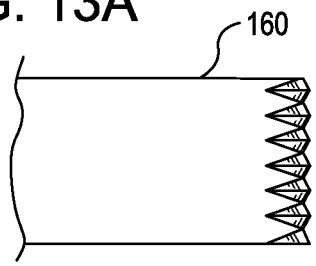
FIGS. 13A-13C are respective side, plan, and cutaway plan views of an embodiment of a cooling fin.
Figure 13B:
Figure 13C:
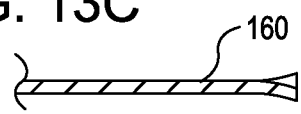
Figure 13D:
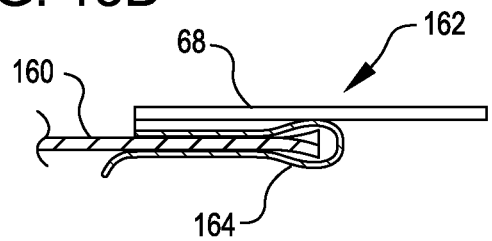
FIG. 13D is a cutaway plan view of an embodiment of a frozen-substance probe mounted to the fin.

FIGS. 13A-13C are side, plan, and cutaway plan views, respectively, of an embodiment of a "crinkled" fin 160, and FIG. 13D is a cutaway plan view of an embodiment of a probe 162 mounted to the fin. The probe 162 may include a support spring clip 164, which replaces the support member 72 (FIG. 5), and which is structured to fit over a bend along the edge of the fin so as to mount the probe to the fin; the probe may be otherwise similar to the probe 62 (FIG. 5) or the probe 120 (FIG. 9) in structure and operation, and may be used to detect a thickness of any frozen substance that accumulates in any pattern.

Alternative embodiments of the probe 162 are contemplated. The probe 162 may have a structure that is different from that described above. Furthermore, in addition to the capacitance sensor 68, the probe 162 may include a temperature sensor such as the temperature sensor 70 (FIG. 5). Moreover, one or more alternative embodiments described above in conjunction with FIGS. 9-12 for the probes 62, 120, and 150 may be applicable to the probe 162.

Figure 14:
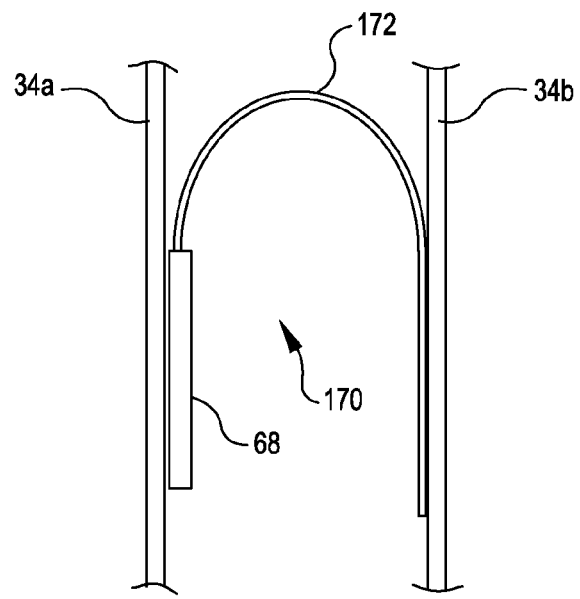
FIG. 14 is a plan view of cooling fins and another embodiment of a frozen-substance probe mounted to the fins.

FIG. 14 is a plan view of an embodiment of a probe 170 mounted between two adjacent cooling fins 34. The probe 170 may include a spring support 172, which replaces the support member 72 (FIG. 5) and which is structured to expand and press against adjacent fins 34a and 34b so as to mount the probe adjacent to at least one fin; the probe may be otherwise similar to the probe 62 (FIG. 5) or the probe 120 (FIG. 9) in structure and operation, and may be used to detect a thickness of any frozen substance that accumulates in any pattern.

Alternative embodiments of the probe 170 are contemplated. The probe 170 may have a structure that is different from that described above. Furthermore, one or more alternative embodiments described above in conjunction with FIGS. 9-13D for the probes 62, 120, 150, and 162 may be applicable to the probe 170.

Figure 15:
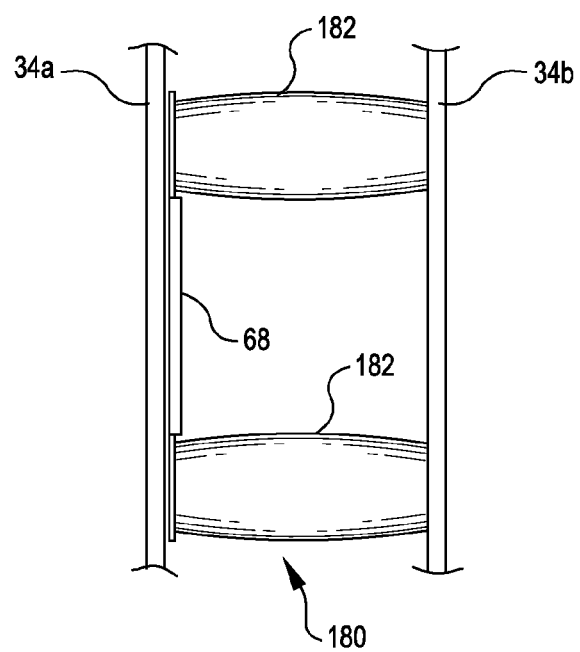
FIG. 15 is a plan view of cooling fins and another embodiment of a frozen-substance probe mounted to the fins.

FIG. 15 is a plan view of an embodiment of a probe 180 mounted between two adjacent cooling fins 34. The probe 180 may include at least one elastic (e.g., rubber or plastic) keeper 182, which replaces the support member 72 (FIG. 5) and which is structured to expand and press against adjacent fins 34a and 34b so as to mount the probe adjacent to at least one fin; the probe may be otherwise similar to the probe 62 (FIG. 5) or the probe 120 (FIG. 9) in structure and operation, and may be used to detect a thickness of any frozen substance that accumulates in any pattern.

Alternative embodiments of the probe 180 are contemplated. The probe 180 may have a structure that is different from that described above. Furthermore, one or more alternative embodiments described above in conjunction with FIGS. 9-14 for the probes 62, 120, 150, 162, and 170 may be applicable to the probe 180.

Figure 16:
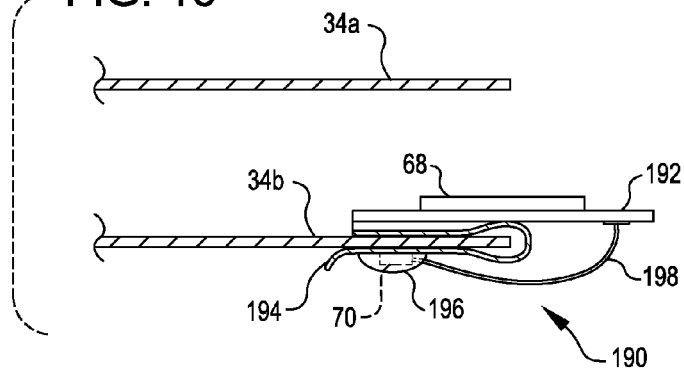
FIG. 16 is a plan view of cooling fins and yet another embodiment of a frozen-substance probe mounted to the fins.

FIG. 16 is a plan view of an embodiment of a probe 190 mounted to a cooling fin 34. The probe 190 may include a printed circuit board 192, a support spring clip 194, which replaces the support member 72 (FIG. 5) and which is structured to hold the printed circuit board to the fin, the capacitance sensor 68 mounted to the printed circuit board, the temperature sensor 70 secured to the clip with an adhesive 196 such as epoxy, and at least one wire 198 for coupling the temperature sensor to the printed circuit board. The probe 190 may be otherwise similar to the probe 62 (FIG. 5) or the probe 120 (FIG. 9) in structure and operation, and may be used to detect a thickness of any frozen substance that accumulates in any pattern.

Alternative embodiments of the probe 190 are contemplated. The probe 190 may have a structure that is different from that described above. Furthermore, one or more alternative embodiments described above in conjunction with FIGS. 9-15 for the probes 62, 120, 150, 162, 170, and 180 may be applicable to the probe 190.

Figure 17A:
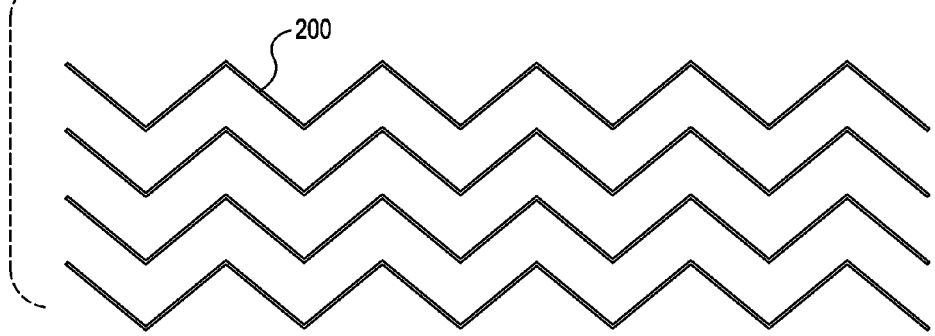
FIG. 17A is a plan view of an embodiment of cooling fins.
Figure 17B:
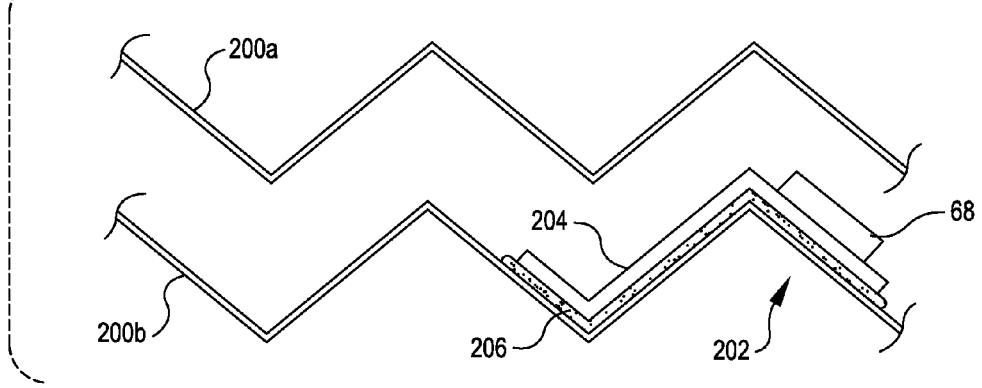
FIG. 17B is a plan view of an embodiment of a frozen-substance probe mounted to one of the cooling fins of FIG. 17A.

FIG. 17A is a plan view of an embodiment of "zig-zag" fins 200, and FIG. 17B is a cutaway plan view of an embodiment of a probe 202 mounted to one of the fins. The probe 202 may include a flexible printed circuit board 204, which replaces the support member 72 (FIG. 5), and which conforms to the shape of a fin 200, an adhesive 206 or other mounting member for holding the printed circuit board to the fin, and the capacitance sensor 68 mounted to the printed circuit board. And the probe 202 may also include the temperature sensor 70. The probe 202 may be otherwise similar to the probe 62 (FIG. 5) or the probe 120 (FIG. 9) in structure and operation, and may be used to detect a thickness of any frozen substance that accumulates in any pattern.

Alternative embodiments of the probe 202 are contemplated. The probe 202 may have a structure that is different from that described above. Furthermore, one or more alternative embodiments described above in conjunction with FIGS. 9-16 for the probes 62, 120, 150, 162, 170, 180, and 190 may be applicable to the probe 202.

Figure 18:
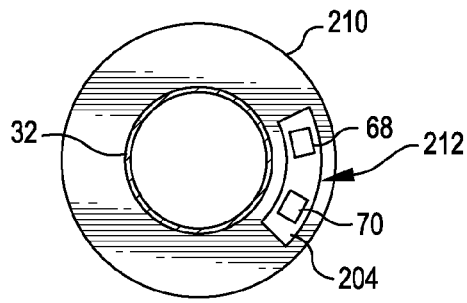
FIG. 18 is a cutaway side view of an embodiment of a cooling tube, an embodiment of a cooling fin, and an embodiment of a frozen-substance probe mounted to the cooling fin.

FIG. 18 is a cutaway side view of an embodiment of a tubing section 32, a radial fin 210 disposed around the tubing, and an embodiment of a probe 212 mounted to the fin. The probe 212 may include a radial printed circuit board 204, which replaces the support member 72 (FIG. 5), and which is structured to conform to the shape of the fin 210, an adhesive (not shown in FIG. 18) or other mounting member for holding the printed circuit board to the fin, and the capacitance and temperature sensors 68 and 70 mounted to the printed circuit board. The probe 212 may be otherwise similar to the probe 62 (FIG. 5) or the probe 120 (FIG. 9) in structure and operation, and may be used to detect a thickness of any frozen substance that accumulates in any pattern.

Alternative embodiments of the probe 212 are contemplated. The probe 212 may have a structure that is different from that described above. Furthermore, one or more alternative embodiments described above in conjunction with FIGS. 9-17 for the probes 62, 120, 150, 162, 170, 180, 190, and 202 may be applicable to the probe 212.

Figure 19:
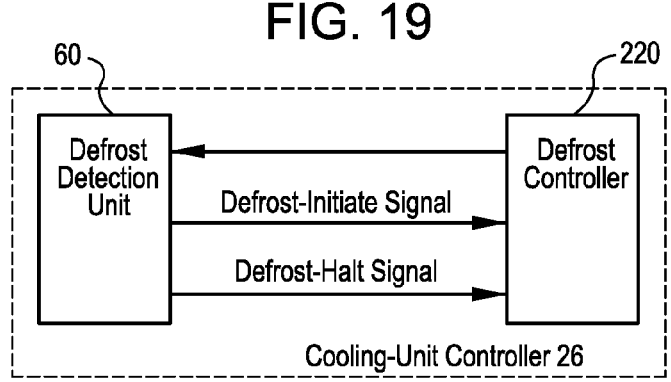
FIG. 19 is a block diagram of an embodiment of the cooling-unit controller of FIG. 1.

FIG. 19 is a block diagram of an embodiment of the cooling-unit controller 26 for the cooling unit 10 of FIG. 1. The controller 26 includes an embodiment of the defrost-condition detection unit 60 of FIG. 5, and includes a defrost controller 220.

In operation, an embodiment of the defrost controller 220 initiates and halts defrost cycles of the cooling unit 10 (FIG. 1) as explained in more detail below.

In response to receiving a defrost-initiate signal from the defrost-condition detection unit 60, the defrost controller 220 initiates a defrost cycle, e.g., by causing the value assembly 20 (FIG. 1) to route hot refrigerant through the tube of the fin-and-tubing assembly 12 (FIG. 1) as previously discussed. The defrost controller 220, however, may delay the defrost cycle from the time that it receives the defrost-initiate signal, e.g., to allow the cooling unit 10 to complete a currently active cooling cycle, or to wait until another cooling unit in the same system finishes a defrost cycle. For example, allowing only one cooling unit in a multi-cooling-unit system to run a defrost cycle at any one time may prevent significant temperature changes in the space being cooled, because at least one cooling unit in the system is available to run a cooling cycle at all times.

And in response to receiving a defrost-halt signal from the defrost-condition detection unit 60, the defrost controller 220 halts a defrost cycle, e.g., by causing the value assembly 20 (FIG. 1) to cease routing hot refrigerant through the tubing of the fin-and-tube assembly 12 (FIG. 1) as previously discussed. The defrost controller 220, however, may delay the halting of the defrost cycle from the time that it receives the defrost-halt signal, e.g., to allow melt off to dissipate.

Alternative embodiments of the cooling-unit controller 26 are contemplated. For example, an embodiment of the cooling-unit controller 26 may include components in addition to the defrost-condition detection unit 60 and the defrost controller 220. Furthermore, the cooling-unit controller 26 may be used in a cooling-unit where a frozen substance other than frost accumulates in the fin-and-tube assembly 12 (FIG. 1). Moreover, the defrost controller 220 may initiate a defrost cycle at least once every predetermined period (e.g., a week) even in the absence of a defrost-initiate signal, and may halt a defrost cycle after a predetermined maximum time even in the absence of a defrost-halt signal. In addition, the defrost controller 220 may provide information to the unit 60. For example, the controller 220 may notify the unit 60 when a defrost cycle has begun and when it has finished.

Figure 20:
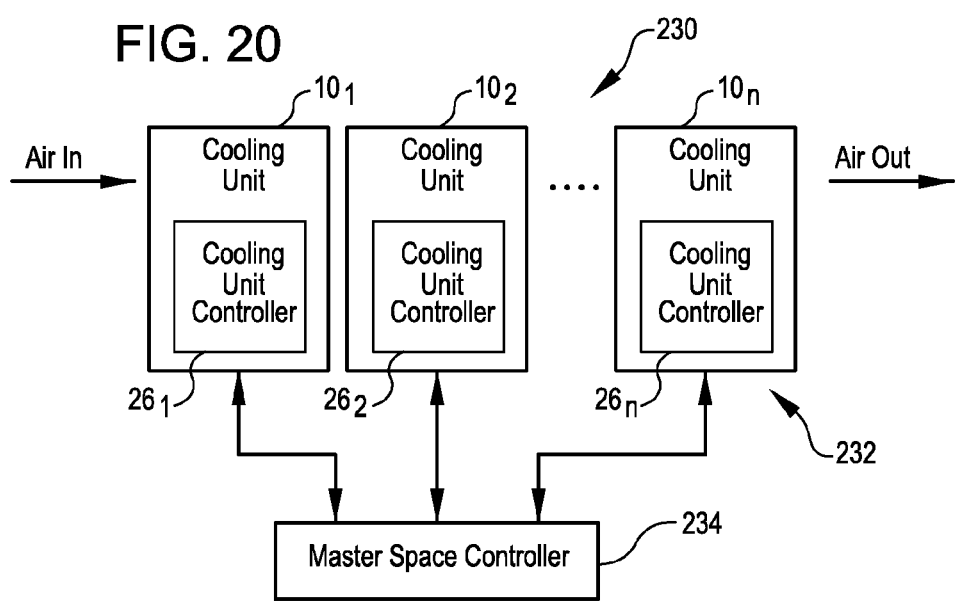
FIG. 20 is a block diagram of an embodiment of a space cooling system that incorporates an embodiment of the cooling-unit controller of FIG. 19.

FIG. 20 is a block diagram of an embodiment of a space cooling system 230 that includes a group 232 of one or more cooling units $10_1$-$10_n$ for cooling a space such as a room of a warehouse, and that includes a master space controller 234 for controlling the cooling units. For clarity, the only components of the cooling units $10_1$-$10_n$ shown in FIG. 20 are the respective cooling-unit controllers $26_1$-$26_n$, at least one of which may be similar to the controller 26 of FIG. 19.

The master space controller 234 controls and coordinates the operations of the cooling units 10 in the group 232.

For example, the space controller 234 may be programmed so as not to allow more than a predetermined number (e.g., one) of the cooling units 10 in the group 232 to run a defrost cycle at any one time. This may allow at least a number of the cooling units 10 to remain available for cooling the temperature-controlled space while others of the cooling units 10 are running defrost cycles.

Furthermore, the space controller 234 may cause a number of the cooling units 10 to run a cooling cycle at any one time, the number of cooling units running cooling cycles dependent, e.g., on the temperature outside of the temperature-controlled space, the temperature inside the temperature-controlled space, and the humidity within the space.

Moreover, in an application where the cooling-unit controllers 26 do not include the defrost-condition detection unit 60 (FIGS. 5 and 19), the master space controller 234 may control the defrost initiation or defrost halting for each cooling unit 10 based on, e.g., a time clock, and may initiate defrost cycles at different rates for different cooling units. For example, if the set temperature of the temperature-controlled space is below freezing, and if the cooling units 10 are arranged in series with each other relative to the air flow, then the cooling fins (cooling fins not shown in FIG. 20) of the cooling unit $10_1$ may accumulate frost at a faster rate than the cooling unit $10_2$, and the cooling unit $10_2$ may accumulate frost at a faster rate than the cooling unit $10_3$ (not shown in FIG. 20), etc. Therefore, the space controller 20 may set the defrost-cycle rate for the cooling unit $10_1$ higher than the defrost-cycle rate for the cooling unit $10_2$, may set the defrost-cycle rate for the cooling unit $10_2$ higher than the defrost-cycle rate for the cooling unit $10_3$, etc. Consequently, even without a defrost-condition detection unit 60, the space controller 232 may improve the energy efficiency of the group 232 of cooling units 10, e.g., by causing each cooling unit 10 to run defrost cycles at a respective rate that corresponds to a frozen-substance-accumulation rate for that cooling unit.

Alternative embodiments of the cooling system 230 are contemplated. For example, where the master space controller 234 does not utilize the defrost-initiate signals from the controllers 26, then it may set the defrost-cycle rate of each cooling unit 10 in the group 232 based on a parameter other than frozen-substance-accumulation rate.

Figure 21:
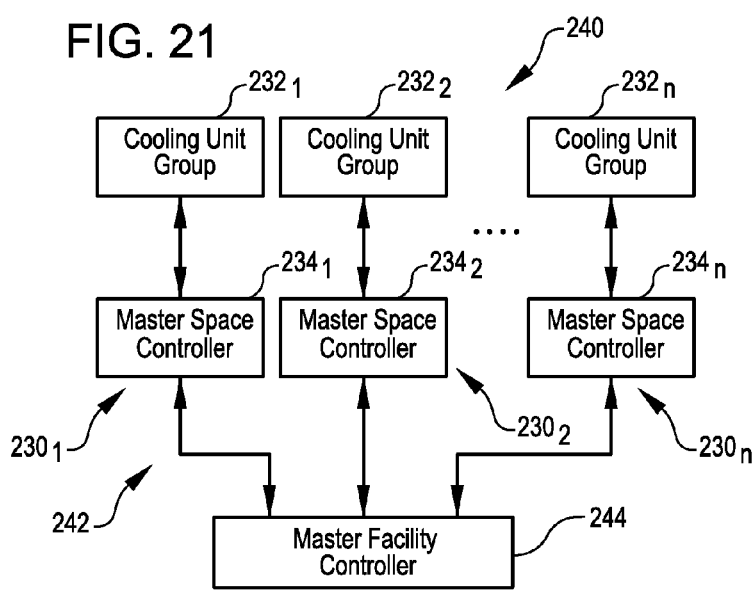
FIG. 21 is a block diagram of a facility cooling system that incorporates an embodiment of the space cooling system of FIG. 20.

FIG. 21 is a block diagram of an embodiment of a facility cooling system 240, which includes a group 242 of one or more of the space cooling systems $230_1$-$230_n$ of FIG. 20 for cooling a facility such as an office building or a multi-space warehouse, and which includes a master facility controller 244 for controlling the space cooling systems.

The master facility controller 244 communicates with the master space controllers $234_1$-$234_n$ to control and coordinate the operations of the cooling systems 230 in the group 242.

For example, the facility controller 244 may be programmed so as not to allow more than a predetermined number (e.g., one) of the cooling systems 230 in the group 242 to have a cooling unit running a defrost cycle at any one time. This may allow at least a number of the cooling systems 230 to remain available for cooling one or more temperature-controlled spaces within the temperature-controlled facility while others of the cooling systems 230 include cooling units that are running defrost cycles.

Furthermore, the facility controller 244 may cause a number of the cooling systems 230 to run a cooling cycle at any one time, the number of cooling systems running cooling cycles dependent, e.g., on the temperature outside of the temperature-controlled facility, the temperature inside the temperature-controlled facility, the humidity within the facility, and available power.

Moreover, in an application where one or more of the space cooling systems 230 do not include the defrost-condition detection unit 60 (FIGS. 5 and 19), the facility controller 244 may control the defrost cycling for each space cooling system based on, e.g., a time clock, and may enable or initiate defrost cycling at different rates for different space cooling systems. For example, the cooling units of the space cooling system $230_1$ may need defrosting less frequently than the cooling units of the cooling system $230_2$. Therefore, the facility controller 244 may set the defrost-cycle rate for the cooling units of the cooling system $230_1$ lower than the defrost-cycle rate for the cooling units of the cooling system $230_2$. Consequently, even without the benefit of a defrost-condition detection unit 60, the facility controller 244 may improve the energy efficiency of the group 242 of space cooling systems 230, e.g., by causing each cooling system 230 to run defrost cycles at a respective rate that corresponds to a frozen-substance-accumulation rate for that cooling system. And the defrost-cycling rates for cooling units with a space cooling system 230 also may be different as discussed above in conjunction with FIG. 20.

And in an application where the cooling systems 230 include defrost-condition detection units 60 (FIGS. 5 and 19), the facility controller 244 may delay the initiation or halting of a defrost cycle in response to a defrost-indicate signal or a defrost-halt signal from a controller 26 (FIG. 19 of a space cooling system 230).

Alternative embodiments of the facility cooling system 240 are contemplated.

Figure 22:
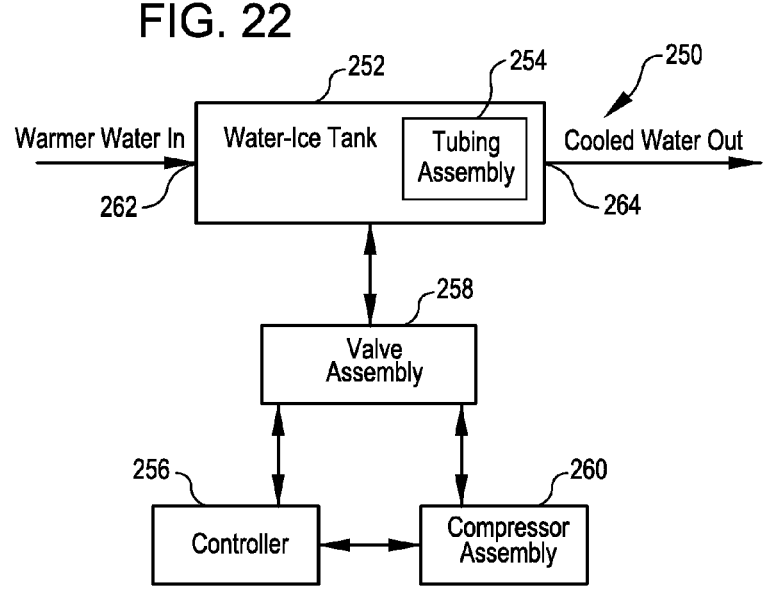
FIG. 22 is a block diagram of another embodiment of a cooling unit that incorporates an embodiment of the frozen-substance detection unit of FIG. 5.

FIG. 22 is a schematic diagram of an embodiment of another cooling system 250, which includes a tank 252 for holding water and ice, a tubing assembly 254 disposed inside the tank, a controller 256, a valve assembly 258, a compressor assembly 260, a tank input port 262, and a tank output port 264.

Figure 23:
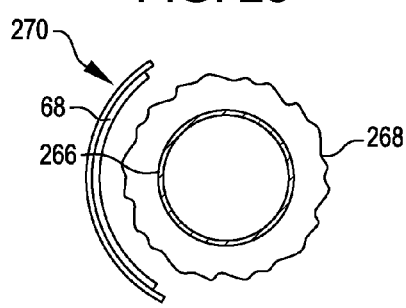
FIG. 23 is a cut-away side view of an embodiment of a cooling tube and an embodiment of a frozen-substance probe of the cooling system of FIG. 22.

FIG. 23 is a cutaway side view of tubing 266 of the tube assembly 254 (FIG. 22), ice 268 formed around the tubing, and a curved ice-thickness probe 270 having the capacitor sensor 68, where the probe may be otherwise similar in structure and in operation to the probe 62 (FIG. 5).

Referring to FIGS. 22 and 23, the operation of an embodiment of the cooling system 250 is discussed.

During an ice-generating cycle, the controller 256 controls the valve assembly 258 and the compressor assembly 260 to route cold refrigerant through the tubing 266 of the tube assembly 254.

In response to the cold refrigerant, the ice 268 forms around the tubing 266.

In response to detecting, via the capacitance sensor 68, that the thickness of the ice 268 around the tubing 266 has approximately reached a predetermined thickness, the controller 256 halts the flow of cold refrigerant through the tubing 266. Because the dielectric constant $\in_{r\_ice}$ for ice is different than the dielectric constant $\in_{r\_water}$ for water, at least at one frequency, the capacitance between the sensor 68 and the tubing 266 (which may be held at a constant voltage such as ground) changes as the thickness of the ice changes. Therefore, the capacitance between the sensor 68 and the tubing 266 may be used to derive the thickness of the ice accumulated between the sensor and the tubing in a manner similar to that discussed above in conjunction with FIG. 6.

Next, during a space-cooling cycle, warmer water from a temperature-controlled space enters the tank 252 via the input port 262. The warmer water causes the ice 268 to melt. But because the temperature of melting ice remains at approximately 32° F., then the incoming warmer water is cooled, and the cooled water exits the tank 252 via the output port 264, and cools one or more temperature-controlled spaces.

The controller 256 causes the system 250 to initiate a subsequence ice-generating cycle when the sensor 68 indicates that the thickness of the ice 268 has fallen below a predetermined threshold thickness. Or, the system 250 may run the ice-generating cycle at a predetermined time interval.

Then the controller 26 repeats the above-described procedure.

For example, suppose that the cooling system 250 is installed in a building, and that the cost of electricity is much higher during the day than it is at night. To save costs, the controller 256 may run the ice-generating cycle at night when the cost of electricity is lower, and then use the melting ice 268 to cool the building during the day when the cost of electricity is higher. Furthermore, the controller 256 may adjust the ice thickness at which the controller 256 halts the ice-generating cycle based, e.g., on the temperature outside of the building. For example, the hotter the outside temperature, the thicker the ice, and vice versa. By making only about enough ice 268 at night to cool the building the following day, the controller 256 may reduce the energy consumption of, and thus further reduce the cost of electricity for, the cooling system 250.

Still referring to FIGS. 22 and 23, alternate embodiments of the cooling system 250 are contemplated. For example, although the tank 252 is described as being filled with water, it may be filled with any other liquid having a suitable freezing/melting temperature.

Referring to FIGS. 1-23, alternate embodiments are contemplated. For example, any function described above as being performed in hardware may be performed in software, and vice-versa. Furthermore, although a defrost cycle has been described as being long enough to remove all of an accumulated frozen substance, a defrost cycle may be long enough to remove some, but not all, of the accumulated frozen substance. Furthermore, although described as being useful for certain frost patterns, embodiments of the above-described apparati and techniques may be useful for other frost patterns. Moreover, although described as being located in certain places within a fin-and-tube assembly, embodiments of the above-described probes, sensors, apparati, and techniques may be useful if the probes/sensors are located in other places within a cooling unit.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

What is claimed is:

1. A detection unit, comprising:
a probe including a frozen-substance sensor configured to provide an indication of a thickness of a frozen substance formed between the sensor and a first cooling fin of a cooling unit; and
a processor configured to generate an indication that the cooling unit is ready for removal of at least part of the frozen substance in response to the thickness of the frozen substance being greater than a threshold thickness;
wherein the probe is configured to generate a signal as the indication of the thickness of the frozen substance, the signal corresponding to a value of capacitance between the sensor and the fin; and
wherein the processor is configured:
to generate an indication that the cooling unit is ready for removal of at least part of the frozen substance in response to the signal corresponding to a capacitance value that has a predetermined relationship to a capacitance threshold value that corresponds to the threshold thickness;
to determine a first post-defrost capacitance value corresponding to the signal;
to adjust the capacitance threshold value in response to the first post-defrost capacitance value;
to determine a second post-defrost capacitance value in response to the signal after determining the first post-defrost capacitance value; and
to adjust the capacitance threshold value in response to the second post-defrost capacitance value if the second post-defrost capacitance value is less than the first post-defrost capacitance value.

2. The detection unit of claim 1 wherein the sensor is further configured to provide an indication of a thickness of a frozen substance formed between the sensor and a second cooling fin of the cooling unit.

3. The detection unit of claim 1 wherein the probe further includes a support configurable to hold the sensor spaced apart from the cooling fin.

4. The detection unit of claim 1, further comprising a cable configured to couple the probe to the processor.

5. The detection unit of claim 1 wherein the processor is configured to receive the signal.

6. The detection unit of claim 1, further comprising:
wherein the probe includes a wireless transmitter configured to transmit the signal; and
a wireless receiver configured to receive the transmitted signal and to provide the received signal to the processor.

7. The detection unit of claim 1, further comprising:
a capacitance determiner that is configured to receive the signal and to approximately determine the value of the capacitance from the signal; and
wherein the processor is configured to compare the determined capacitance value to the capacitance threshold value that corresponds to the threshold thickness, and to generate a signal indicating that the cooling unit is ready for removal of at least part of the frozen substance in response to the determined capacitance value exceeding the capacitance threshold value.

8. The detection unit of claim 1 wherein:
the probe comprises a capacitance determiner that is configured to receive the signal and to approximately determine the value of the capacitance from the signal; and
the processor is configured to receive the determined capacitance value from the probe, to compare the determined capacitance value to the capacitance threshold value that corresponds to the threshold thickness, and to generate a signal indicating that the cooling unit is ready for removal of at least part of the frozen substance in response to the determined capacitance value exceeding the capacitance threshold value.

9. The detection unit of claim 1 wherein
the processor is configured:
to receive a calibration signal; and
to set a threshold signal value substantially equal to a value that the signal has at substantially a time that the calibration signal is received, the threshold signal value corresponding to the threshold thickness.

10. The detection unit of claim 1 wherein
the processor is configured:
to determine a first value of the signal before the sensor is located adjacent to the fin;
to determine a second value of the signal after the sensor is located adjacent to the fin; and
to determine from the first and second values a third value corresponding the threshold thickness.

11. The detection unit of claim 1, further comprising:
a capacitance determiner configured
to determine a first capacitance value from the signal before the frost sensor is located adjacent to the fin; and
to determine a second capacitance value from the signal after the frost sensor is located adjacent to the fin; and
wherein the processor is configured
to generate a third capacitance value substantially equal to a difference between the first and second capacitance values; and
to calculate a fourth capacitance value that corresponds to the threshold thickness, the fourth capacitance value substantially equal to a product including the third capacitance value, the threshold thickness, and a dielectric constant of the frozen substance.

12. The detection unit of claim 11 wherein the processor is configured to generate an indication that the cooling unit is ready for removal of at least part of the frozen substance in response to the signal corresponding to a capacitance value that has a predetermined relationship to the fourth capacitance value.

13. The detection unit of claim 1, further comprising:
a capacitance determiner configured to determine a first capacitance value from the signal before the sensor is located adjacent to the fin; and to determine a second capacitance value from the signal after the sensor is located adjacent to the fin; and wherein the processor is configured:

to generate a third capacitance value substantially equal to a difference between the first and second capacitance values; and to calculate a fourth capacitance value that corresponds to the threshold thickness, the fourth capacitance value substantially equal to a product including the third capacitance value, the threshold thickness, a density of the frozen substance, and a dielectric constant of the frozen substance.

14. The detection unit of claim 1 wherein the processor is configured to generate a frozen-substance-removal signal as the indication that the cooling unit is ready for the at least partial removal of the frozen substance.

15. The detection unit of claim 1 wherein:

the probe includes a temperature sensor; and the processor is configured to generate an indication that the cooling unit is ready to end a frozen-substance-removal cycle in response to the temperature sensor indicating a temperature that has a predetermined relationship to a temperature threshold.

16. A frozen-substance-removal controller, comprising:

a detection unit including:

a probe including a frozen-substance sensor configured to provide an indication of a thickness of a frozen substance formed between the sensor and a first cooling fin of a cooling unit; and a processor configured to generate a first indication that the fluid-cooling unit is ready for removal of at least part of the frozen substance in response to the thickness of the frozen substance being greater than a threshold thickness;

wherein the probe is configured to generate a signal as the indication of the thickness of the frozen substance, the signal corresponding to a value of capacitance between the sensor and the fin; and wherein the processor is configured:

to generate an indication that the cooling unit is ready for removal of at least part of the frozen substance in response to the signal corresponding to a capacitance value that has a predetermined relationship to a capacitance threshold value that corresponds to the threshold thickness;

to determine a first post-defrost capacitance value corresponding to the signal;

to adjust the capacitance threshold value in response to the first post-defrost capacitance value;

to determine a second post-defrost capacitance value in response to the signal after determining the first post-defrost capacitance value; and to adjust the capacitance threshold value in response to the second post-defrost capacitance value if the second post-defrost capacitance value is less than the first post-defrost capacitance value; and a controller configured to cause the cooling unit to initiate a frozen-substance-removal cycle in response to the indication from the processor.

17. The frozen-substance-removal unit of claim 16 wherein the controller is configured to cause the cooling unit to perform a sequence of actions that constitutes at least part of the frozen-substance-removal cycle.

18. The frozen-substance-removal unit of claim 16 wherein the controller is configured to route a fluid having a temperature above the freezing temperature of the frozen substance through a tube of the cooling unit during the frozen-substance-removal cycle.

19. The frozen-substance-removal unit of claim 16 wherein the controller is configured to route a fluid having a temperature above the freezing temperature of the frozen substance through a tube of the cooling unit during the frozen-substance-removal cycle, the tube being adjacent to the fin.

20. The frozen-substance-removal unit of claim 16 wherein the controller is configured to cause a heater element to have a temperature above the freezing temperature of the frozen substance during the frozen-substance-removal cycle.

21. The frozen-substance-removal unit of claim 16 wherein the controller is configured to cause a heater element to have a temperature above the freezing temperature of the frozen substance during the frozen-substance-removal cycle, the heater element being adjacent to the fin.

22. The frozen-substance-removal unit of claim 16 wherein:

the probe includes a temperature sensor;

the processor is configured to generate a second indication that the cooling unit is ready to end the frozen-substance-removal cycle in response to the temperature sensor indicating a temperature that has a predetermined relationship to a temperature threshold; and the controller is configured to cause the cooling unit to halt the frozen-substance-removal cycle in response to the second indication from the processor.

23. A cooling system, comprising:

a first cooling unit having at least one first cooling fin on which may form a frozen substance having a thickness;

a first probe including a frozen-substance sensor disposed adjacent to one of the at least one first cooling fin and configured to provide an indication of the thickness of the frozen substance by indicating a capacitance that is dependent on the thickness of the frozen substance formed between the sensor and the one of the at least one first cooling;

a first processing circuit configured to generate a first indication that the cooling unit is ready for removal of at least part of the frozen substance in response to the thickness of the frozen substance being greater than a threshold thickness;

wherein the first probe is configured to generate a signal as the indication of the thickness of the frozen substance, the signal corresponding to a value of the capacitance; and wherein first the processing circuit is further configured:

to generate the first indication that the cooling unit is ready for removal of at least part of the frozen substance in response to the signal corresponding to a capacitance value that is greater than a capacitance threshold value that corresponds to the threshold thickness;

to determine a first post-defrost capacitance value corresponding to the signal;

to adjust the capacitance threshold value in response to the first post-defrost capacitance value;

to determine a second post-defrost capacitance value in response to the signal after determining the first post-defrost capacitance value; and to adjust the capacitance threshold value in response to the second post-defrost capacitance value if the second post-defrost capacitance value is less than the first post-defrost capacitance value; and a first controller configured to cause the first cooling unit to initiate a frozen-substance-removal cycle in response to the first indication from the processing circuit.

24. The cooling system of claim 23 wherein the cooling unit comprises a gas-cooling unit.

25. The cooling system of claim 23 wherein the cooling unit comprises an air-cooling unit.

26. The cooling system of claim 23 wherein the cooling unit comprises a freezer unit.

27. The cooling system of claim 23 wherein the cooling unit comprises a refrigeration unit.

28. The cooling system of claim 23, further comprising:
a second cooling unit having at least one second cooling fin on which may form a frozen substance having a thickness;
a second probe including a frozen-substance sensor disposed adjacent to one of the at least one second fin and configured to provide an indication of the thickness of the frozen substance formed on the one of the at least one second fin;
a second processing circuit configured to generate a second indication that the second cooling unit is ready for removal of at least part of the frozen substance in response to the thickness of the frozen substance being greater than a threshold thickness; and
a second controller configured to cause the second cooling unit to initiate a frozen-substance-removal cycle in response to the second indication from the second processing circuit.

29. The cooling system of claim 23, further comprising:
a second cooling unit having at least one second cooling fin on which may form a frozen substance having a thickness;
a second probe including a frozen-substance sensor disposed adjacent to one of the at least one second fin and configured to provide an indication of the thickness of the frozen substance formed on the one of the at least one second fin;
a second processing circuit configured to generate a second indication that the second cooling unit is ready for removal of at least part of the frozen substance in response to the thickness of the frozen substance being greater than a threshold thickness;
a second controller configured to cause the second cooling unit to initiate a frozen-substance-removal cycle in response to the second indication from the second processing circuit; and
a master controller configured to coordinate occurrences of the frozen-substance-removal cycles of the first and second cooling units.

30. The cooling system of claim 23, further comprising:
a second cooling unit having at least one second cooling fin on which may form a frozen substance having a thickness;
a second probe including a frozen-substance sensor disposed adjacent to one of the at least one second fin and configured to provide an indication of the thickness of the frozen substance formed on the one of the at least one second fin;
a second processing circuit configured to generate a second indication that the second cooling unit is ready for removal of at least part of the frozen substance in response to the thickness of the frozen substance being greater than a threshold thickness;

a second controller configured to cause the second cooling unit to initiate a frozen-substance-removal cycle in response to the indication from the second processing circuit; and
a master controller configured to prohibit an occurrence of the frozen-substance-removal cycle of the first cooling unit from overlapping an occurrence of the frozen-substance-removal cycle of the second cooling unit.

31. A facility, comprising:
a space; and
a cooling system configured to cool the space, the cooling system comprising:
a first cooling unit having at least one first cooling fin on which may form a frozen substance having a thickness;
a first probe including a frozen-substance sensor disposed adjacent to the fin and configured to provide an indication of the thickness of the frozen substance by forming a capacitance with one or more of the at least one first cooling fin;
wherein the first probe is configured to generate a signal as the indication of the thickness of the frozen substance, the signal corresponding to the value of the capacitance;
a first processing circuit configured to generate a first indication that the cooling unit is ready for removal of at least part of the frozen substance in response to the signal corresponding to a capacitance value that has a predetermined relationship to a capacitance threshold value that corresponds to the thickness of the frozen substance being greater than a threshold thickness;
wherein the first processing circuit is further configured:
to generate the first indication that the cooling unit is ready for removal of at least part of the frozen substance in response to the signal corresponding to a capacitance value that is greater than a capacitance threshold value that corresponds to the threshold thickness;
to determine a first post-defrost capacitance value corresponding to the signal;
to adjust the capacitance threshold value in response to the first post-defrost capacitance value;
to determine a second post-defrost capacitance value in response to the signal after determining the first post-defrost capacitance value; and
to adjust the capacitance threshold value in response to the second post-defrost capacitance value if the second post-defrost capacitance value is less than the first post-defrost capacitance value; and
a first controller configured to cause the first cooling unit to initiate a frozen-substance-removal cycle in response to the first indication from the processing circuit.

32. A method, comprising:
receiving an indication of a thickness of a frozen substance formed over a first cooling fin of a cooling unit in response to a sensed capacitance formed by an electrode and the first cooling fin;
indicating that the cooling unit is ready for melting of at least part of the frozen substance in response to the thickness of the frozen substance being greater than a threshold thickness;
wherein receiving the indication comprises receiving a signal that indicates a value of capacitance for a capacitor formed between the first cooling fin and the electrode;
wherein indicating comprises indicating that the cooling unit is ready for melting of at least part of the frozen substance in response to the signal corresponding to a capacitance value having a predetermined relationship to a threshold capacitance value that corresponds to the thickness threshold;

determining a first post-melting capacitance value corresponding to the signal;

adjusting the capacitance threshold value in response to the first post-melting capacitance value;

determining a second post-melting capacitance value in response to the signal after determining the first post-melting capacitance value; and adjusting the threshold capacitance value in response to the second post-defrost capacitance value if the second post-melting capacitance value is less than the first post-melting capacitance value.

33. The method of claim 32, further comprising indicating that the cooling unit is ready to end the melting of the frozen substance in response to a temperature near the fin having a predetermined relationship to a temperature threshold.

34. A method, comprising:

receiving a signal representing a first capacitance value from a sensor while the sensor is remote from a fin of a cooling unit, the first capacitance value corresponding to a capacitance offset;

receiving the signal representing a second capacitance value from the sensor while the sensor is adjacent to the fin and while the fin is approximately free of the frozen substance, the second capacitance value corresponding to a no-frozen-substance-accumulation capacitance value; and determining from the first and second capacitance values a third capacitance value corresponding a threshold thickness of a frozen substance that may form over the fin.

35. The method of claim 34 wherein receiving the signal representing the second capacitance value comprises receiving the signal representing the second capacitance value while there is none of the frozen substance formed over the fin.

36. A method, comprising:

receiving a first capacitance value associated with a sensor while the sensor is remote from a fin of a cooling unit;

receiving a second capacitance value associated with the sensor while the sensor is adjacent to the fin;

generating a third capacitance value substantially equal to a difference between the first and second capacitance values;

calculating a fourth capacitance value that corresponds to a threshold thickness of a frozen substance that may form over the fin, the fourth capacitance value being a function of the third capacitance value, the threshold thickness, and a dielectric constant of the frozen substance;

receiving a fifth capacitance value associated with the sensor after calculating the fourth capacitance value and while the sensor is adjacent to the fin; and causing the cooling unit to execute a defrost cycle in response to the fifth capacitance value equaling or exceeding the fourth capacitance value.

37. The method of claim 36 wherein calculating the fourth capacitance comprises calculating the fourth capacitance value as a function of the third capacitance value, the threshold thickness, a dielectric constant of the frozen substance, and a density of the frozen substance.

* * * * *